United States Patent
Fuhr et al.

(10) Patent No.: US 9,941,554 B2
(45) Date of Patent: *Apr. 10, 2018

(54) BATTERY MODULE HAVING A CELL TRAY WITH THERMAL MANAGEMENT FEATURES

(71) Applicant: Johnson Controls Advanced Power Solutions LLC, Wilmington, DE (US)

(72) Inventors: Jason D. Fuhr, Sussex, WI (US); Kem M. Obasih, Brookfield, WI (US); Richard M. DeKeuster, Racine, WI (US); Robert J. Mack, Milwaukee, WI (US); Gary P. Houchin-Miller, Fox Point, WI (US); Dhavalkumar Patel, Houston, TX (US)

(73) Assignee: Johnson Controls Advanced Power Solutions LLC, Wilmington, DE (US)

( * ) Notice: Subject to any disclaimer, the term of this patent is extended or adjusted under 35 U.S.C. 154(b) by 740 days.

This patent is subject to a terminal disclaimer.

(21) Appl. No.: 14/107,974

(22) Filed: Dec. 16, 2013

(65) Prior Publication Data

US 2014/0234687 A1  Aug. 21, 2014

Related U.S. Application Data

(63) Continuation of application No. 13/329,086, filed on Dec. 16, 2011, now Pat. No. 8,609,268, which is a
(Continued)

(51) Int. Cl.
*H01M 10/6556* (2014.01)
*H01M 2/10* (2006.01)
(Continued)

(52) U.S. Cl.
CPC ..... *H01M 10/5057* (2013.01); *H01M 2/1077* (2013.01); *H01M 2/12* (2013.01);
(Continued)

(58) Field of Classification Search
CPC .................. H01M 10/6551; H01M 10/6556
See application file for complete search history.

(56) References Cited

U.S. PATENT DOCUMENTS

| 4,383,013 A | 5/1983 | Bindin et al. |
| 4,583,583 A | 4/1986 | Wittel |

(Continued)

FOREIGN PATENT DOCUMENTS

| CN | 1848518 A | 10/2006 |
| DE | 0681156 A1 | 11/1995 |

(Continued)

OTHER PUBLICATIONS

Extended European Search Report for EP Application No. 10790206.6 dated Jun. 3, 2014; 8 pgs.
(Continued)

*Primary Examiner* — Miriam Stagg
*Assistant Examiner* — Brent C Thomas
(74) *Attorney, Agent, or Firm* — Fletcher Yoder, P.C.

(57) ABSTRACT

A battery module includes a plurality of electrochemical cells and a structure including an upper portion configured to support a bottom portion of each of the plurality of electrochemical cells and a lower portion coupled to the upper portion. The lower portion includes a thermal management feature having at least one passage provided therein. The passage is configured for a thermal management fluid to pass therethrough to provide thermal management to the electrochemical cells of the battery module.

22 Claims, 15 Drawing Sheets

Related U.S. Application Data continuation of application No. PCT/US2010/039030, filed on Jun. 17, 2010.

(60) Provisional application No. 61/218,387, filed on Jun. 18, 2009.

(51) Int. Cl.

| | | |
|---|---|---|
| *H01M 2/12* | (2006.01) | |
| *H01M 10/625* | (2014.01) | |
| *H01M 10/647* | (2014.01) | |
| *H01M 10/6567* | (2014.01) | |
| *H01M 10/643* | (2014.01) | |
| *H01M 10/6554* | (2014.01) | |
| *H01M 10/613* | (2014.01) | |
| *H01M 10/0525* | (2010.01) | |
| *H01M 10/615* | (2014.01) | |
| *H01M 10/653* | (2014.01) | |
| *H01M 10/6563* | (2014.01) | |
| *H01M 10/6551* | (2014.01) | |
| *H01M 10/6565* | (2014.01) | |

(52) U.S. Cl.
CPC ....... *H01M 2/1252* (2013.01); *H01M 10/613* (2015.04); *H01M 10/625* (2015.04); *H01M 10/643* (2015.04); *H01M 10/647* (2015.04); *H01M 10/6554* (2015.04); *H01M 10/6556* (2015.04); *H01M 10/6567* (2015.04); *H01M 10/0525* (2013.01); *H01M 10/615* (2015.04); *H01M 10/653* (2015.04); *H01M 10/6551* (2015.04); *H01M 10/6563* (2015.04); *H01M 10/6565* (2015.04)

(56) References Cited

U.S. PATENT DOCUMENTS

| | | |
|---|---|---|
| 6,050,331 A | 4/2000 | Breault et al. |
| 6,087,038 A | 6/2000 | Flament et al. |
| 6,448,741 B1 | 9/2002 | Inui et al. |
| 6,942,944 B2 | 9/2005 | Said et al. |
| 7,147,071 B2 | 12/2006 | Gering et al. |
| 7,547,487 B1 | 6/2009 | Smith et al. |
| 7,764,496 B2* | 7/2010 | Nguyen .................. H01G 2/08 307/147 |
| 7,968,223 B2 | 6/2011 | Lee et al. |
| 8,197,958 B2 | 6/2012 | Gaben et al. |
| 2002/0177035 A1 | 11/2002 | Oweis et al. |
| 2003/0082439 A1 | 5/2003 | Sakakibara |
| 2007/0087266 A1* | 4/2007 | Bourke ............... H01M 2/0242 429/159 |
| 2008/0220315 A1* | 9/2008 | Dougherty .......... H01M 2/1077 429/53 |
| 2008/0318121 A1* | 12/2008 | Takagi ................ H01M 2/1072 429/120 |
| 2009/0021221 A1 | 1/2009 | Krauer et al. |
| 2009/0220850 A1 | 9/2009 | Bitsche et al. |
| 2010/0028758 A1* | 2/2010 | Eaves ................... H01M 2/105 429/50 |
| 2010/0279159 A1* | 11/2010 | Meintschel ......... H01M 6/5038 429/94 |
| 2010/0291414 A1 | 11/2010 | Bell et al. |
| 2011/0104545 A1 | 5/2011 | Meintschel et al. |

FOREIGN PATENT DOCUMENTS

| | | | |
|---|---|---|---|
| DE | 102006025535 A1 | 12/2007 | |
| DE | 102007010743 B3 | 9/2008 | |
| FR | 2908557 A1 | 5/2008 | |
| JP | 2007012486 A | 1/2007 | |
| WO | 2006108529 A1 | 10/2006 | |
| WO | 2008074034 A1 | 6/2008 | |
| WO | 2008099602 A1 | 8/2008 | |
| WO | 2008104359 A | 9/2008 | |
| WO | 2008114923 A1 | 9/2008 | |
| WO | WO 2008104359 A1 * | 9/2008 | ......... H01M 6/5038 |
| WO | 2009018941 A1 | 2/2009 | |

OTHER PUBLICATIONS

Chinese Office Action for Chinese Application No. 201080034325.1 dated Dec. 10, 2013; 8 pgs.

\* cited by examiner

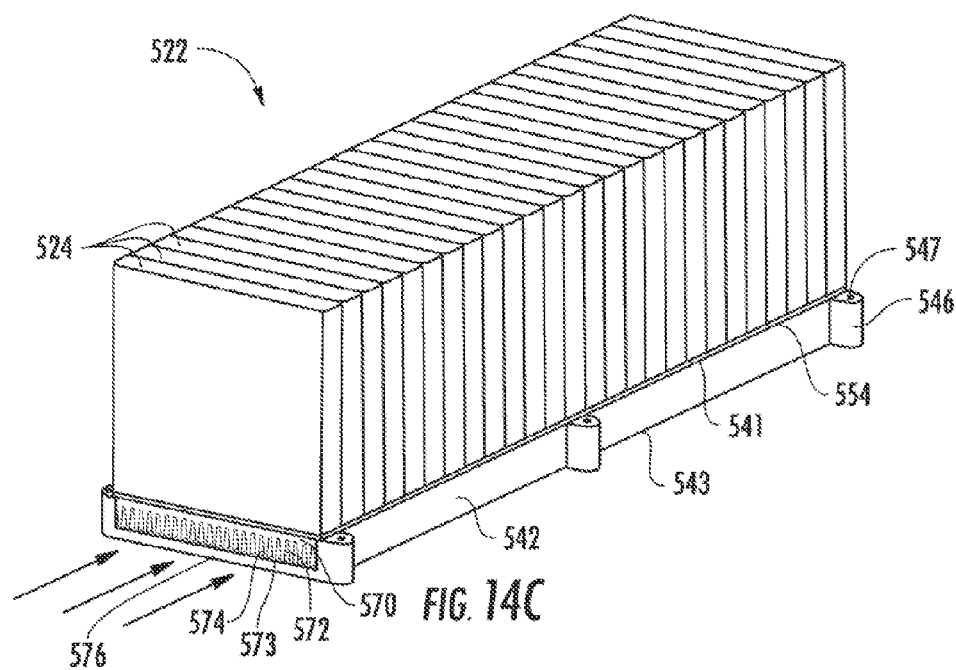
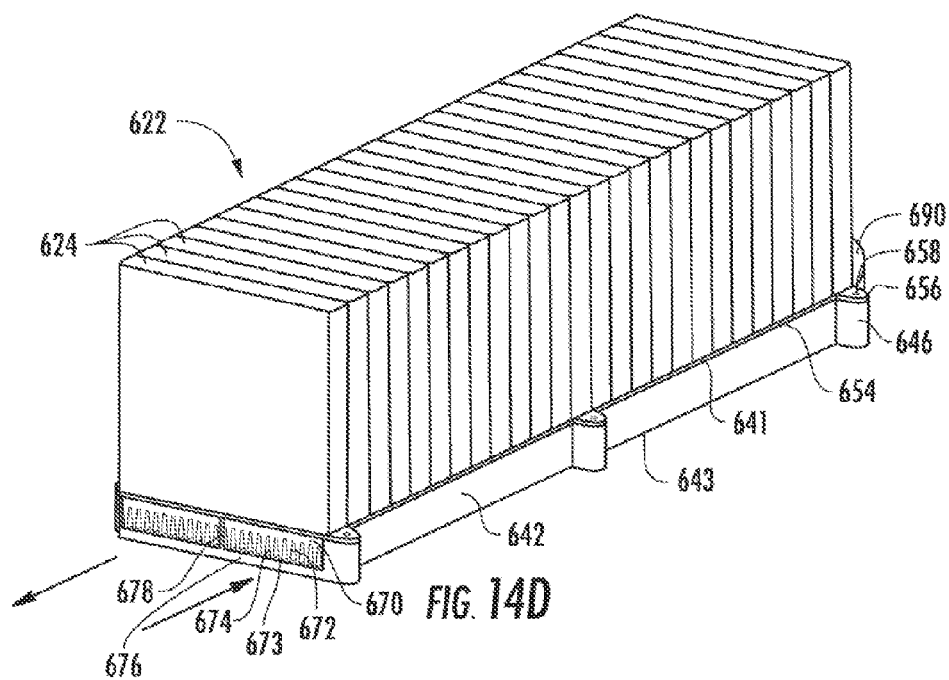

BATTERY MODULE HAVING A CELL TRAY WITH THERMAL MANAGEMENT FEATURES

CROSS-REFERENCE TO RELATED PATENT APPLICATIONS

This application is a continuation of U.S. patent application Ser. No. 13/329,086, filed Dec. 16, 2011, which is a continuation of International Patent Application No. PCT/US2010/039030, filed Jun. 17, 2010, which claims the benefit of and priority to U.S. Provisional Patent Application No. 61/218,387, filed Jun. 18, 2009. The entire disclosures of U.S. patent application Ser. No. 13/329,086, International Patent Application No. PCT/US2010/039030 and U.S. Provisional Patent Application No. 61/218,387 are incorporated herein by reference in their entireties.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It also would be desirable to provide a battery module and/or system that includes any one or more of the advantageous features that will be apparent from a review of the present disclosure.

SUMMARY

According to an exemplary embodiment, a battery module includes a plurality of electrochemical cells and a structure including an upper portion configured to support a bottom portion of each of the plurality of electrochemical cells and a lower portion coupled to the upper portion. The lower portion includes a thermal management feature having at least one passage provided therein. The passage is configured for a thermal management fluid to pass therethrough to provide thermal management to the electrochemical cells of the battery module.

According to an exemplary embodiment, a battery system includes a plurality of battery modules having a plurality of electrochemical cells and a structure including an upper portion configured to support a bottom portion of each of the plurality of electrochemical cells and a lower portion coupled to the upper portion. The lower portion includes a thermal management feature configured to provide thermal management to the electrochemical cells and is configured to have a thermal management fluid pass therethrough.

According to an exemplary embodiment, a battery module includes a tray comprising an upper portion and a lower portion. The upper portion is configured to support a bottom of each of a plurality of electrochemical cells. The lower portion includes a thermal management feature having at least one channel provided therein. The channel is configured to receive a thermal management fluid therethrough to provide thermal management to the electrochemical cells of the battery module.

BRIEF DESCRIPTION OF THE DRAWINGS

FIGS. 14A-14D are partial perspective views of battery modules according to various exemplary embodiments.

DETAILED DESCRIPTION

Figure 1:
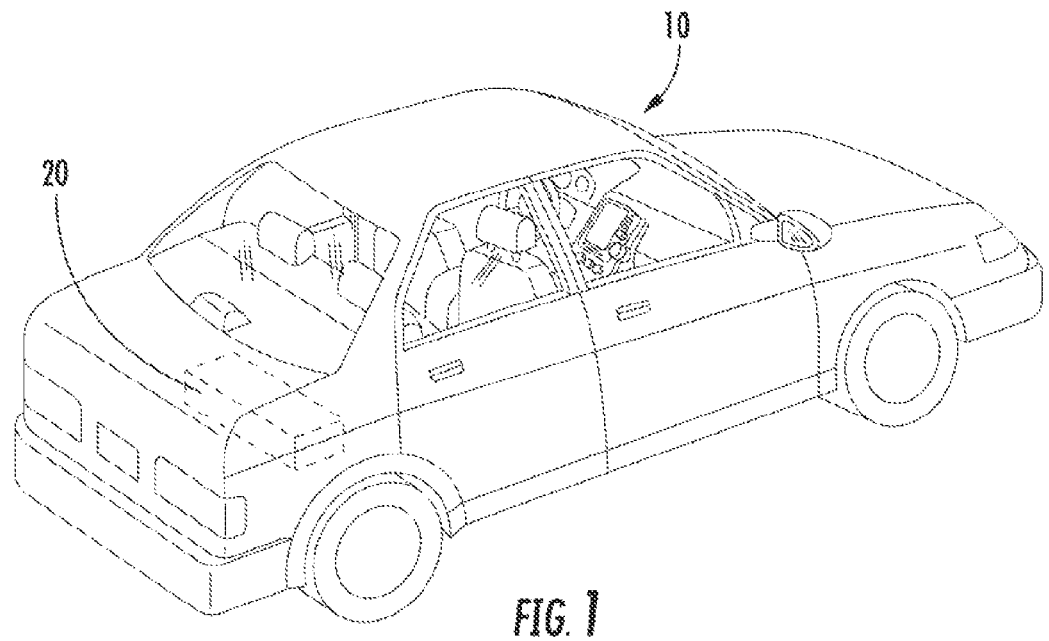
FIG. 1 is a perspective view of a vehicle including a battery system according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an electric vehicle (EV), a hybrid electric vehicle (HEV), a plug-in hybrid electric vehicle (PHEV), or other type of vehicle using electric power for propulsion (collectively referred to as "electric vehicles").

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents, or cooling devices, etc.), and a variety of other considerations.

Figure 2:
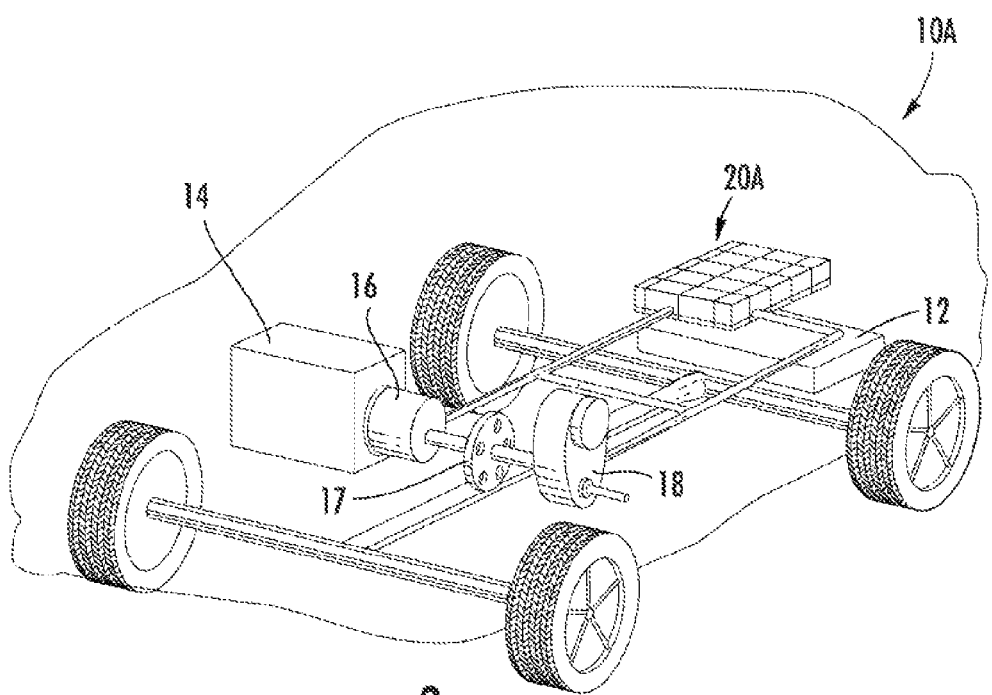
FIG. 2 is a cutaway schematic view of a vehicle including a battery system according to an exemplary embodiment.

FIG. 2 illustrates a cutaway schematic view of a vehicle 10A provided in the form of an HEV according to an exemplary embodiment. A battery system 20A is provided toward the rear of the vehicle 10A proximate a fuel tank 12 (the battery system 20A may be provided immediately adjacent the fuel tank 12 or may be provided in a separate compartment in the rear of the vehicle 10A (e.g., a trunk) or may be provided elsewhere in the vehicle 10A). An internal combustion engine 14 is provided for times when the vehicle 10A utilizes gasoline power to propel the vehicle 10A. An electric motor 16, a power split device 17, and a generator 18 are also provided as part of the vehicle drive system.

Such a vehicle 10A may be powered or driven by just the battery system 20A, by just the engine 14, or by both the battery system 20A and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery systems 20, 20A, the type of vehicles 10, 10A, the type of vehicle technology (e.g., EV, HEV, PHEV, etc.), and the battery chemistry, among other features, may differ from those shown or described.

Figure 3:
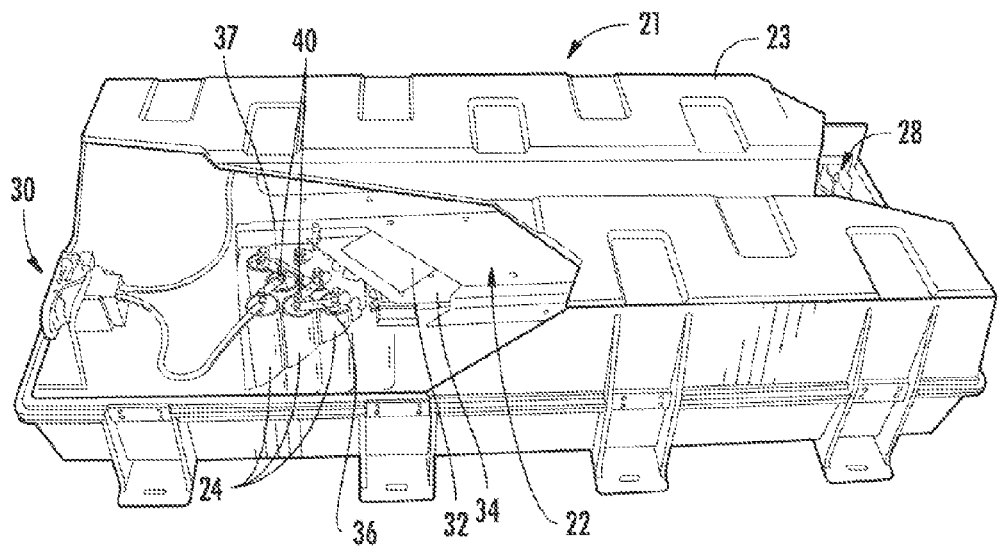
FIGS. 3-4 are partial cutaway views of a battery system according to an exemplary embodiment.
Figure 4:
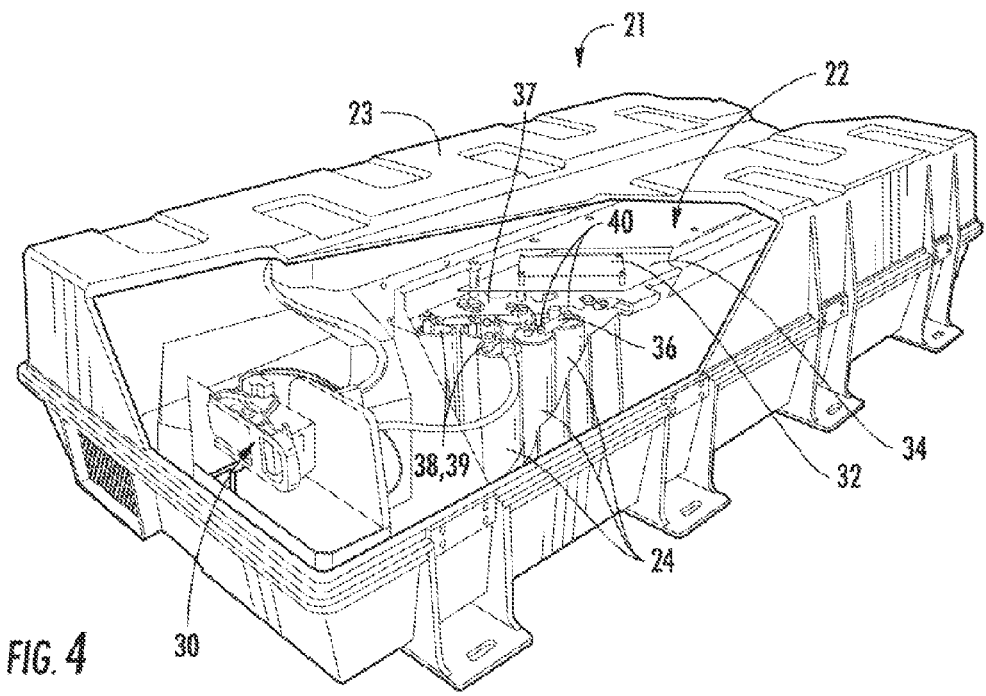
Figure 5:
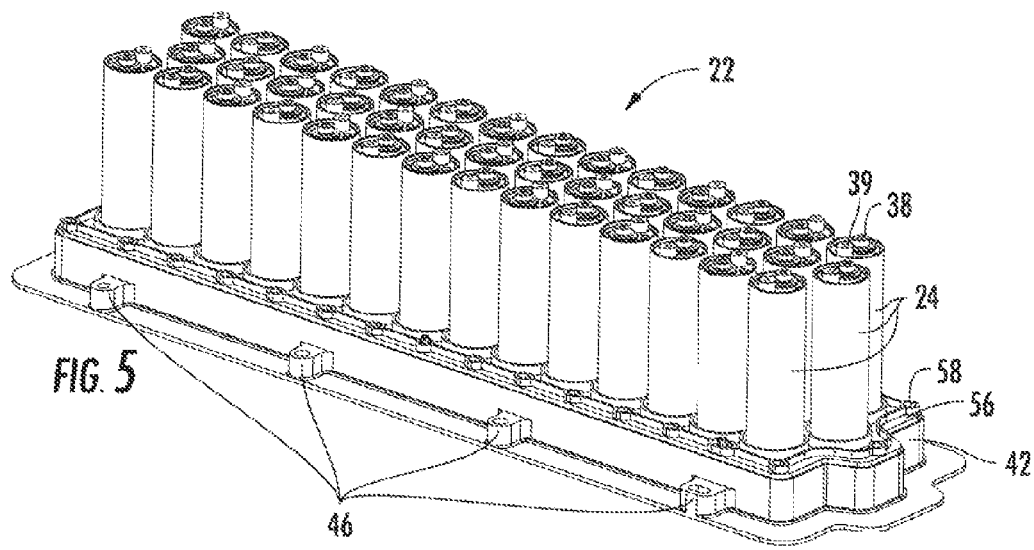
FIGS. 5-6 are perspective views of a portion of a battery module for use in a battery system according to an exemplary embodiment.
Figure 6:
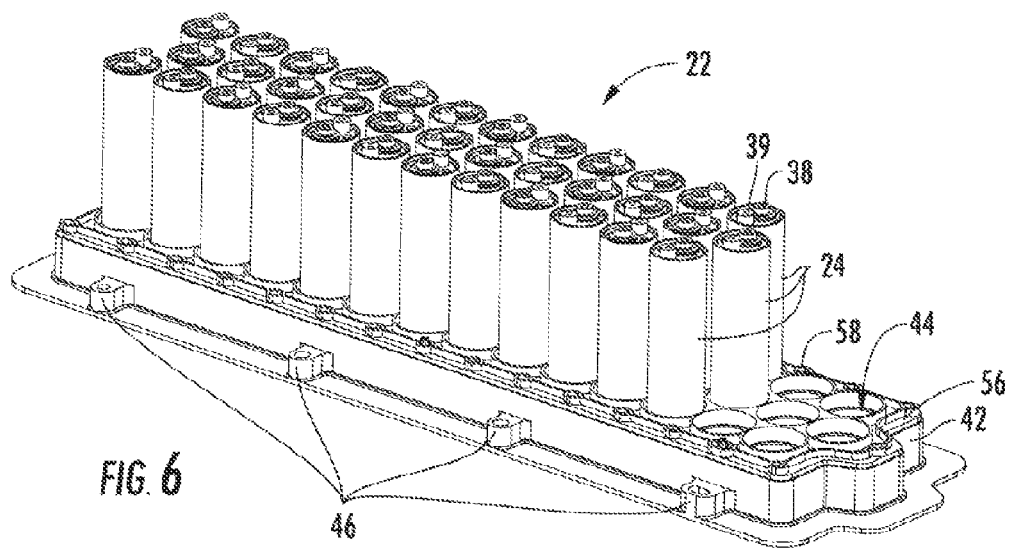

Referring now to FIGS. 3-4, partial cutaway views of a battery system 21 are shown according to an exemplary embodiment. According to an exemplary embodiment, the battery system 21 is responsible for packaging or containing electrochemical batteries or cells 24, connecting the electrochemical cells 24 to each other and/or to other components of the vehicle electrical system, and regulating the electrochemical cells 24 and other features of the battery system 21. For example, the battery system 21 may include features that are responsible for monitoring and controlling the electrical performance of the battery system 21, managing the thermal behavior of the battery system 21, containing and/or routing of effluent (e.g., gases that may be vented from a cell 24), and other aspects of the battery system 21.

According to the exemplary embodiment as shown in FIGS. 3-4, the battery system 21 includes a cover or housing 23 that encloses the components of the battery system 21. Included in the battery system are two battery modules 22 located side-by-side inside the housing 23. According to other exemplary embodiments, a different number of battery modules 22 may be included in the battery system 21, depending on the desired power and other characteristics of the battery system 21. According to other exemplary embodiments, the battery modules 22 may be located in a configuration other than side-by-side (e.g., end-to-end, etc.).

As shown in FIGS. 3-4, the battery system 21 also includes a high voltage connector 28 located at one end of the battery system 21 and a service disconnect 30 located at a second end of the battery system 21 opposite the first end according to an exemplary embodiment. The high voltage connector 28 connects the battery system 21 to a vehicle 10. The service disconnect 30, when actuated by a user, disconnects the two individual battery modules 22 from one another, thus lowering the overall voltage potential of the battery system 21 by half to allow the user to service the battery system 21.

According to an exemplary embodiment, each battery module 22 includes a plurality of cell supervisory controllers (CSCs) 32 to monitor and regulate the electrochemical cells 24 as needed. According to other various exemplary embodiments, the number of CSCs 32 may differ. The CSCs 32 are mounted on a member shown as a trace board 34 (e.g., a printed circuit board). The trace board 34 includes the necessary wiring to connect the CSCs 32 to the individual electrochemical cells 24 and to connect the CSCs 32 to the battery management system (not shown) of the battery system 21. The trace board 34 also includes various connectors to make these connections possible (e.g., temperature connectors, electrical connectors, voltage connectors, etc.).

Still referring to FIGS. 3-4, each of the battery modules 22 includes a plurality of electrochemical cells 24 (e.g., lithium-ion cells, nickel-metal-hydride cells, lithium polymer cells, etc., or other types of electrochemical cells now known or hereafter developed). It should be noted that the embodiments shown in FIGS. 5-17D may also use these types of cells. According to an exemplary embodiment, the electrochemical cells 24 are generally cylindrical lithium-ion cells configured to store an electrical charge. According to other exemplary embodiments, the electrochemical cells 24 could have other physical configurations (e.g., oval, prismatic, polygonal, etc.). The capacity, size, design, and other features of the electrochemical cells 24 may also differ from those shown according to other exemplary embodiments.

Each of the electrochemical cells 24 are electrically coupled to one or more other electrochemical cells 24 or other components of the battery system 21 using connectors provided in the form of bus bars 36 or similar elements. According to an exemplary embodiment, the bus bars 36 are housed or contained in bus bar holders 37. According to an exemplary embodiment, the bus bars 36 are constructed from a conductive material such as copper (or copper alloy), aluminum (or aluminum alloy), or other suitable material. According to an exemplary embodiment, the bus bars 36 may be coupled to terminals 38, 39 of the electrochemical cells 24 by welding (e.g., resistance welding) or through the use of fasteners 40 (e.g., a bolt or screw may be received in a hole at an end of the bus bar 36 and screwed into a threaded hole in the terminal 38, 39).

Referring now to FIGS. 5-8, a portion of a battery module 22 for use in a battery system 21 is shown according to an exemplary embodiment. The battery module 22 includes a plurality of electrochemical cells 24 provided in a first member or tray 42 (e.g., structure, housing, etc.). Although illustrated in FIG. 5 as having a particular number of electrochemical cells 24 (i.e., three rows of electrochemical cells arranged such that 14 electrochemical cells are arranged in each row, for a total of 42 electrochemical cells), it should be noted that according to other exemplary embodiments, a different number and/or arrangement of electrochemical cells 24 may be used in the battery module 22 depending on any of a variety of considerations (e.g., the desired power for the battery module 22, the available space within which the battery module 22 must fit, etc.).

According to an exemplary embodiment, the tray 42 receives the individual electrochemical cells 24 in the proper orientation for assembling the battery module 22. According to an exemplary embodiment, the tray 42 may also include features to provide spacing of the cells away from the bottom of the tray and/or from adjacent cells. For example, according to an exemplary embodiment, the trays may include a series of features shown as sockets 44 (e.g., openings, apertures, etc.) to locate and hold the electrochemical cells 24 in position above the bottom of the tray 42.

As shown in FIGS. 5-8, according to another exemplary embodiment, the tray 42 may also include features shown as bosses 46 that are intended to aid in the retention of a housing or cover (not shown) to enclose and/or retain the plurality of cells 24. According to another exemplary embodiment, the bosses 46 may also aid in securing the tray 42 to the housing 23 of the battery system 21 or to a vehicle. According to an exemplary embodiment, the tray 42 may be made of a polymeric material or other suitable material (e.g., electrically insulated material). However, according to another exemplary embodiment, the tray 42 may be made of a thermally conductive material (such as, e.g., aluminum (or aluminum alloy), copper (or copper alloy), steel (or steel alloy), or other suitable material) to aid in conductively cooling the electrochemical cells 24 of the battery module 22.

Figure 9:
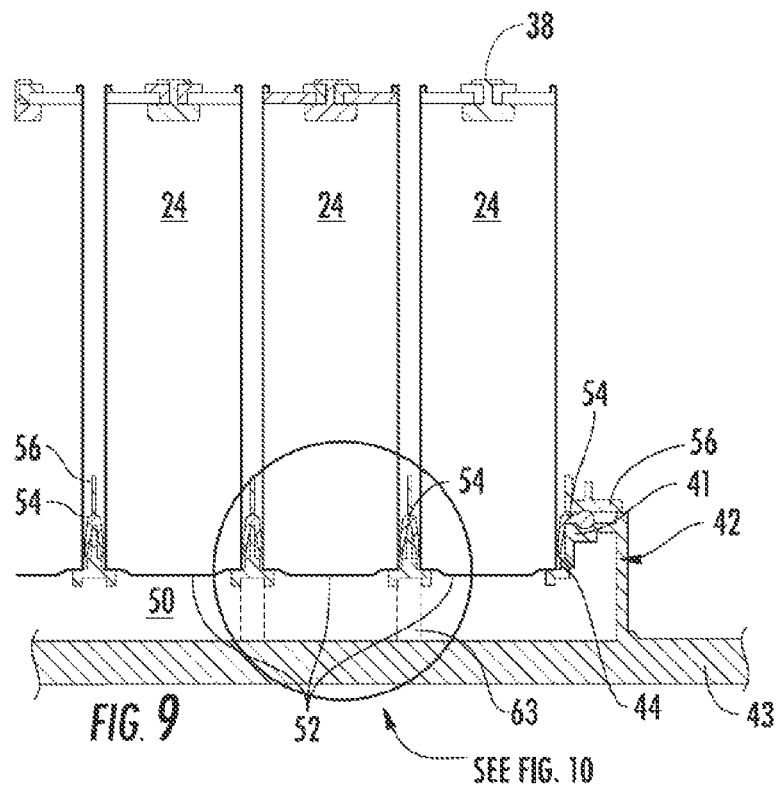
FIG. 9 is a cross-sectional view of a portion of the battery module of FIG. 8 taken along line 9-9 of FIG. 8.
Figure 10:
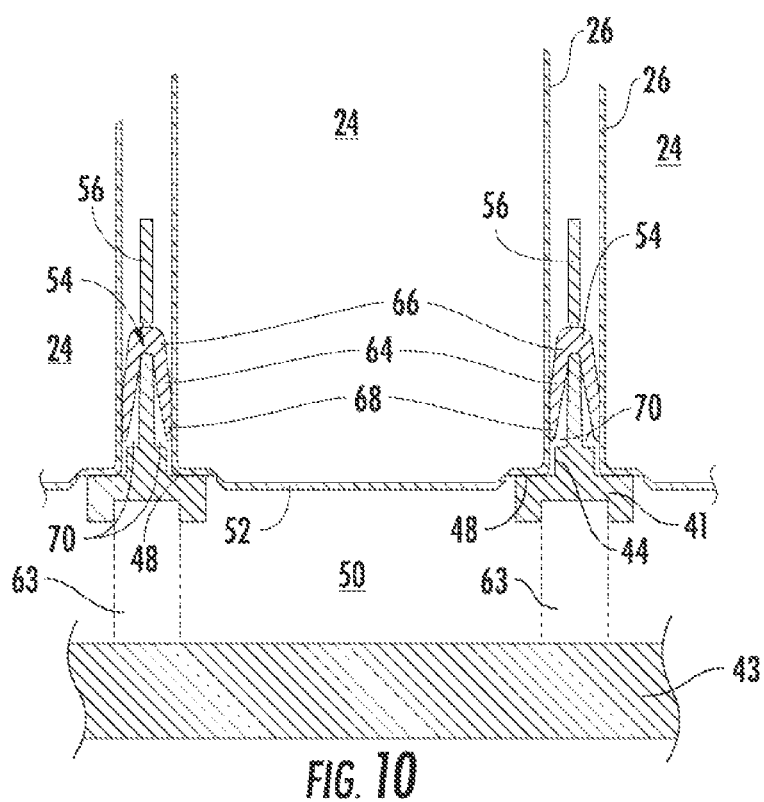
FIG. 10 is a detail view of a portion of the battery module of FIG. 9.

According to an exemplary embodiment, the sockets 44 of the tray 42 are configured to receive (e.g., retain, hold, position, etc.) a lower end or portion of the individual electrochemical cells 24 (e.g., the outer portion of the housing 26 of the cells 24). According to an exemplary embodiment, the sockets 44 are generally circular openings having at least one step or surface 48 (e.g., as shown in FIG. 10) and are configured to receive the lower portion of the electrochemical cell 24. According to other exemplary embodiments, the openings of the sockets 44 may have other shapes to receive cells of different shapes (e.g., prismatic, oval, etc.). The lower step or surface 48 of the socket 44 positions the electrochemical cell 24 at a top portion of an airspace or chamber 50 defined by the tray 42 (e.g., as shown in FIG. 9). The chamber 50 is configured to receive gases and/or effluent that may be vented by the electrochemical cells 24 through a vent feature or vent device (e.g., vent 52 as shown in FIG. 9) of the electrochemical cell 24.

Figure 7:
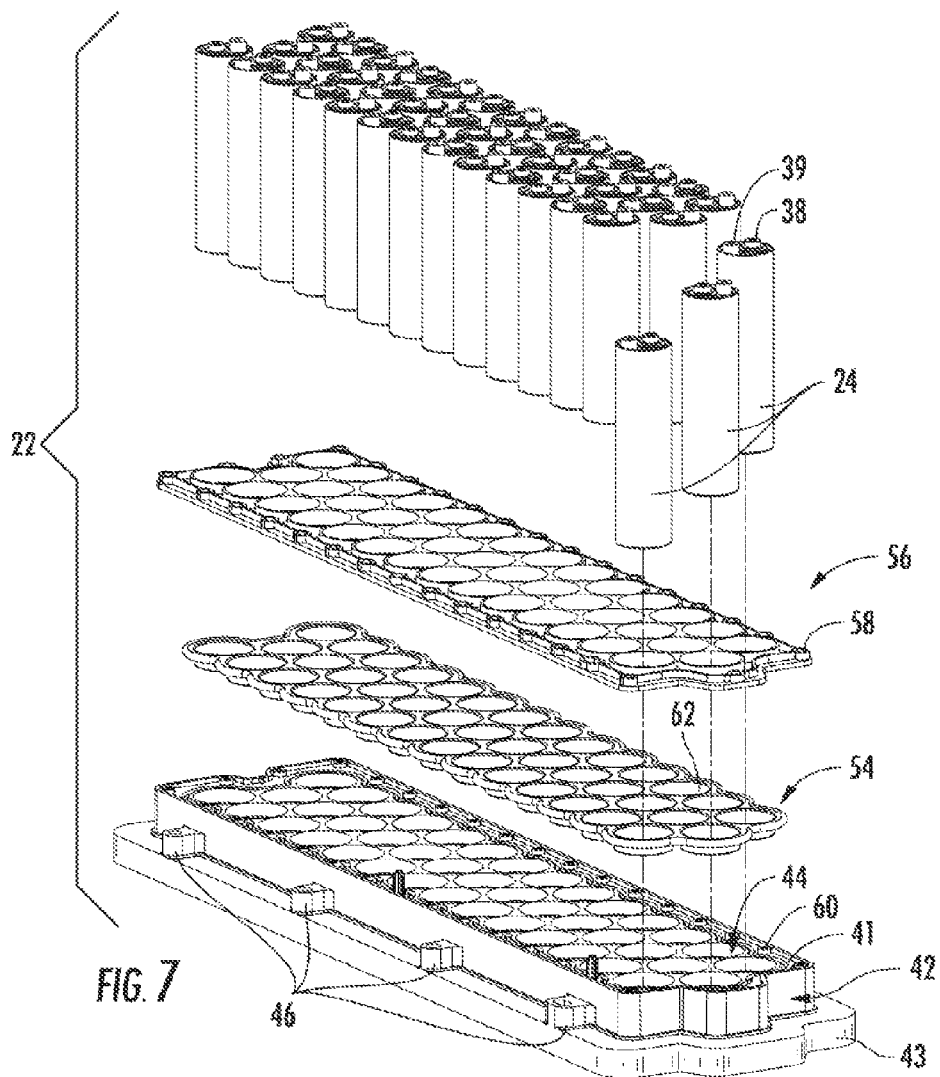
FIG. 7 is a partial exploded view of the battery module of FIG. 5 including a thermally conductive plate according to an exemplary embodiment.
Figure 8:
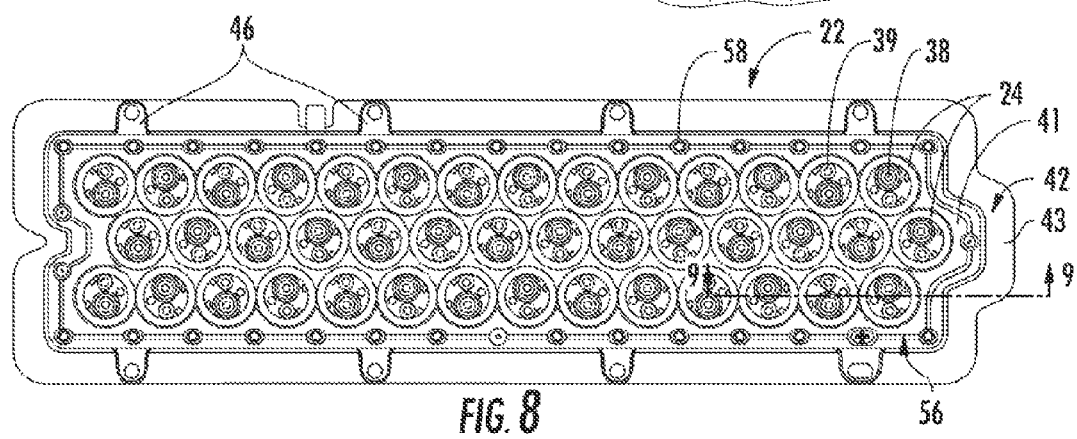
FIG. 8 is a top view of the battery module of FIG. 7.

Referring now to FIGS. 7, 9, and 10, the battery module 22 may also include a member shown as a gasket or seal 54. According to an exemplary embodiment, the seal 54 is configured to aid in sealing the lower portions of the electrochemical cells 24 in the tray 42 to help retain any gases vented from the electrochemical cells 24 into the chamber 50. According to an exemplary embodiment, the seal 54 is provided adjacent a top surface of the tray 42 (e.g., the seal 54 is provided adjacent a top or upper portion 41 of the tray 42).

According to an exemplary embodiment, the seal 54 may be constructed from a pliable, non-conductive material such as silicone. According to another exemplary embodiment, the seal 54 may be die cut from a silicone sheet or may be a molded silicone member (e.g., made by an injection molding process). According to another exemplary embodiment, the seal may be any seal that is shown and described in International Patent Application No. PCT/US2009/053697, filed Aug. 13, 2009, the entire disclosure of which is incorporated herein by reference. According to other exemplary embodiments, the seal may be any seal that is now known or developed in the future.

According to an exemplary embodiment, a member (fixture, device, plate, retainer, etc.) shown as a clamping plate 56 may be provided above the seal 54 in order to keep the seal 54 in place in relation to the tray 42. The clamping plate 56 may be coupled to the tray 42, for example, by threaded fasteners (not shown) that extend through holes 58 in the clamping plate 56 and are received by threaded holes 60 in the tray 42. According to another exemplary embodiment, the clamping plate 56 may be coupled to the tray 42 via a snap fit.

According to an exemplary embodiment, the seal 54 includes a plurality of openings 62 that align with the plurality of sockets 44 of the tray 42. As shown in FIG. 10, each of the openings 62 of the seal 54 comprise a lip portion or edge portion 64 (e.g., a deformable extension) provided in contact with an electrochemical cell 24. According to an exemplary embodiment, the edge portion 64 of the seal 54 is angled in toward the electrochemical cell 24 to provide an interference fit with the housing 26 of the electrochemical cell 24 in order to aid in sealing the chamber 50.

According to an exemplary embodiment, the edge portion 64 of the seal 54 is thinner than the rest of the seal 54, giving the edge portion flexibility to conform to the outer diameter of the electrochemical cell 24 in order to aid in sealing in the electrochemical cell 24. According to another exemplary embodiment, the edge portion 64 of the seal 54 is tapered (e.g., as shown in FIG. 10) from the main portion 66 of the seal 54 down to the tip 68 of the edge portion 64. This taper aids in giving the edge portion 64 the flexibility to conform to the outer diameter of the electrochemical cell 24 but still maintain the strength to allow the edge portion 64 to keep its shape over time (e.g., to minimize creep and relaxation of the seal 54 to maintain the interference fit with the electrochemical cell 24).

According to an exemplary embodiment, a space 70 is provided between the edge portion 64 of the seal 54 and each socket 44 of the tray 42 (e.g., as shown in FIG. 10). The space 70 is connected (e.g., in fluid communication) with the chamber 50 such that when gases are vented into the chamber 50 the gases may enter the space 70 (e.g., by slipping past the bottom of the electrochemical cell 24 and the socket 44). According to an exemplary embodiment, the vented gases press the seal 54 tighter against the electrochemical cell 24 to increase the sealing characteristics of the seal 54.

Referring to FIGS. 7-10, battery module 22 is shown to include a thermally conductive plate 43 according to an exemplary embodiment. According to an exemplary embodiment, the thermally conductive plate 43 is coupled to a lower portion of the tray 42. According to another exemplary embodiment, the thermally conductive plate 43 is the lower portion of the tray 42 and is coupled to or integrally formed with the upper portion 41 of the tray 42.

According to an exemplary embodiment, the battery module 22 is configured to have a thermal management fluid (e.g., a liquid such as a refrigerant, water, water-glycol mixture, etc. or gas such as air or other suitable gas) flow past (e.g., underneath, by, across, etc.) the thermally conductive plate 43 to provide cooling and/or heating for the cells 24. According to other exemplary embodiments, however, the thermally conductive plate 43 may be configured to have the thermal management fluid flow through the thermally conductive plate 43 (e.g., as shown in FIGS. 10A-11C).

According to the exemplary embodiment shown in FIGS. 9-10, the thermally conductive plate 43 is in thermal conductive contact with a lower portion of the tray 42 which is in thermal conductive contact with the upper portion 41 of the tray 42. The thermally conductive plate 43 may also be in direct thermal conductive contact with the upper portion 41 of the tray 42 (e.g., via optional supports 63). The upper portion 41 of the tray 42 is in thermal conductive contact with the lower portions of the cells 24 to conductively cool and/or heat the cells 24. Having the cells 24 in thermal conductive contact with the thermally conductive plate 43 provides for a (direct) conductive path for heat to be drawn out of the cells 24 (for cooling) or for heat to be provided to the cells 24 (for heating). This allows for more efficient and effective cooling and/or heating of the cells 24.

It should be noted that for clarity reasons, the remainder of this application primarily discusses cooling of the cells 24. However, one of ordinary skill in the art will readily recognize that heating of the cells 24 may also be accomplished, depending on the specific requirements of the application.

According to an exemplary embodiment, both the tray 42 and the thermally conductive plate 43 are constructed from a thermally conductive material (e.g., aluminum, aluminum alloy, copper, copper alloy, steel, steel alloy, etc.). Having a thermally conductive tray 42 and thermally conductive plate 43 allows for relatively efficient thermal management (e.g., cooling and/or heating) of the cells 24 within the battery module 22. According to an exemplary embodiment, the sockets 44 of the tray 42 substantially surround (e.g., cover, contain, circumscribe, etc.) the lower portion of the cells 24 to conductively cool the cells 24. By surrounding a lower portion of the cells 24, the internal cell elements (not shown) of the cells 24 are more effectively cooled. According to one exemplary embodiment, the sockets 44 surround about 20 mm (of height) of the lower portion of the cells 24. According to other exemplary embodiments, the sockets surround more or less than 20 mm of the lower portion of the cells 24.

According to an exemplary embodiment, when a thermally conductive material is used for the tray 42, and the housings 26 of the cells 24 have a charge (e.g., a positive or negative charge), an electrically insulative member (e.g., a seal such as seal 254 shown in FIG. 13) may be provided between the cell 24 and the socket 44 and/or step 48 so that the cell 24 and the tray 42 are not in electrical contact with one another.

According to an exemplary embodiment, the electrically insulative member is a good conductor of heat to efficiently conduct heat away from the cell 24 (and to the tray 42 and the thermally conductive plate 43). According to an exemplary embodiment, the electrically insulative member is constructed from a silicone or other suitable material (e.g., a poly vinyl chloride (PVC) film). According to an exemplary embodiment, the electrically insulative member has a thickness in the range of approximately 0.05 to 0.25 millimeter. According to another exemplary embodiment, the insulator has a thickness of 0.13 millimeters. However, the thickness of the insulator may be greater or smaller according to other exemplary embodiments.

The tray 42 and/or thermally conductive plate 43 may be formed by a casting process (e.g., a die casting process), a stamping process, or any other suitable process. According to an exemplary embodiment, the tray 42 and thermally conductive plate 43 may be constructed as one single piece (e.g., a single unitary body). According to other exemplary embodiments, the tray may be constructed from more than one piece (e.g., the upper portion 41 of the tray 42 may be formed as one piece and the bottom half of the tray and/or thermally conductive plate 43) may be formed as one piece, with the separate pieces being coupled together to form the tray 42).

As shown in FIGS. 9-10, the tray 42 includes optional members or supports 63 that connect the ledge or step 48 of the socket 44 of the tray 42 with the thermally conductive plate 43. These supports 63 allow more efficient thermal conductivity from the cells 24 to the thermally conductive plate 43 by providing a direct path (e.g., a physical connection) between the cells 24 and the thermally conductive plate 43. The supports 63 also help support the cell above the thermally conductive plate 43 to provide a clearance space for the vent 52 of the cells 24 to deploy. According to various exemplary embodiments, these supports 63 may have a cylindrical shape, a rectangular shape, or any other suitable shape.

According to an exemplary embodiment, the supports 63 may be located only under the cells 24 located in the center of the tray 42 (and not the cells located on the exterior of the tray), for example, to limit the total number of supports 63. According to other exemplary embodiments, the supports 63 may be located under each cell 24, or under only selected cells 24. It should be noted that the supports 63 are configured to allow gases that are vented from the cells 24 into the chamber 50 to be freely routed to an opening or exit (not shown) located in the side of the tray 42. This may be accomplished by the supports 63 having holes or apertures in them, or the supports 63 not being a continuous member around the socket 44 or step 48 holding the cell 24 (i.e., the supports 63 do not fully encircle the vent 52 of the cell 24).

Figure 10A:
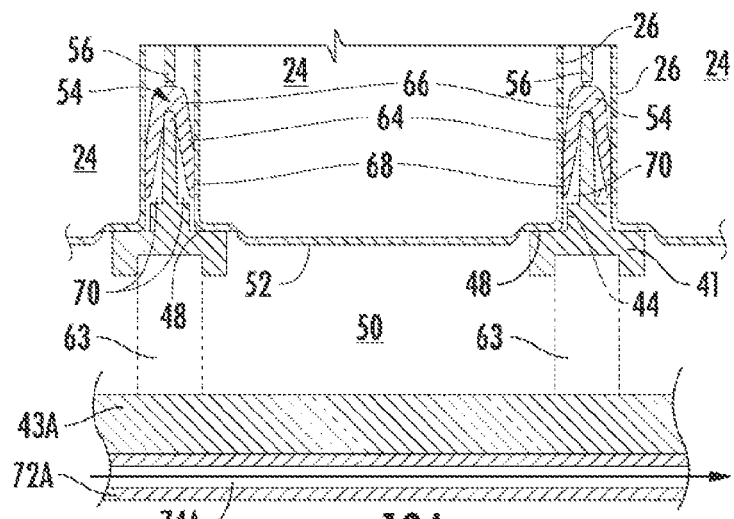
FIGS. 10A-10C are detail views of a portion of a battery module according to other exemplary embodiments.

According to another exemplary embodiment, as shown in FIG. 10A, a thermally conductive plate 43A includes at least one external tube 72A. The tube 72A includes a hollow passage 74A configured to receive a thermal management fluid (e.g., gas or liquid) to flow therethrough to cool (or heat) the thermally conductive plate 43A. As described above, because the cells 24 are in thermal conductive contact with the thermally conductive plate 43A, the cells 24 are also cooled (or heated). According to an exemplary embodiment, the at least one tube 72A is coupled to the thermally conductive plate 43A (e.g., by welding, with fasteners, clamps, an adhesive, or other suitable means).

Figure 10B:
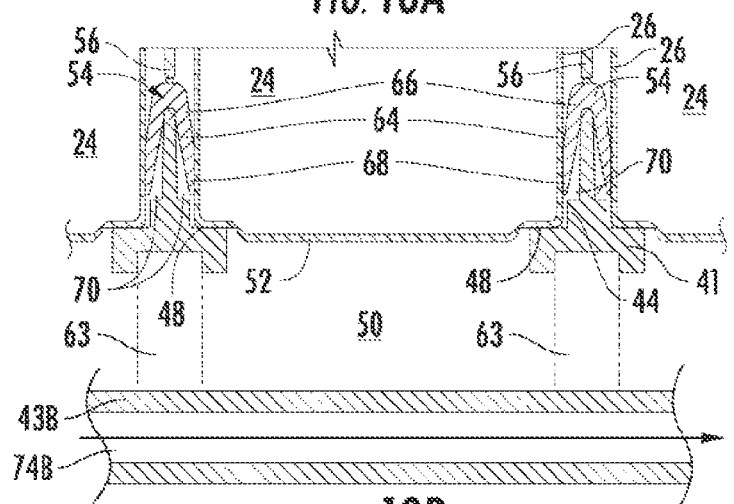

According to another exemplary embodiment, as shown in FIG. 10B, a thermally conductive plate 43B includes at least one internal passage or channel 74B. The internal passage or channel 74B is configured to receive a thermal management fluid (e.g., gas or liquid) to flow therethrough to cool (or heat) the thermally conductive plate 43B (and the cells 24).

Figure 11A:
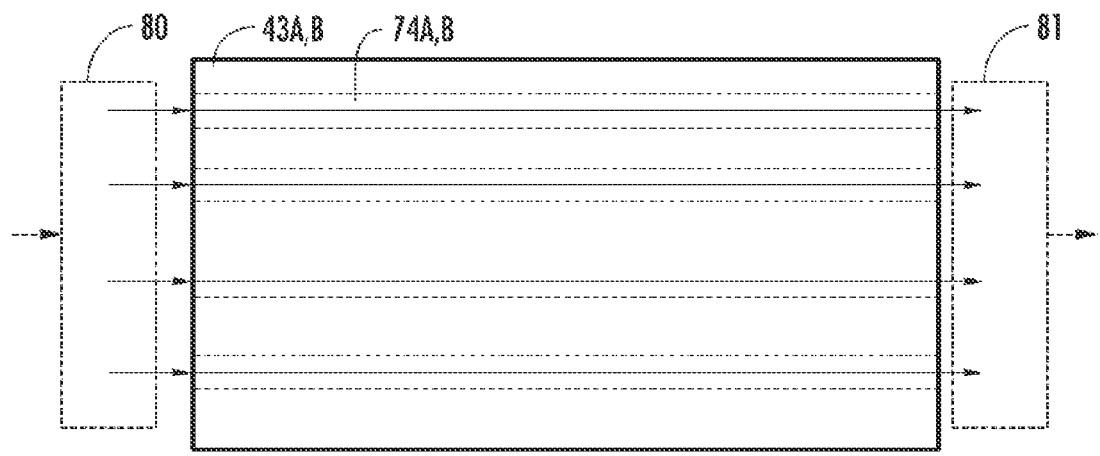
FIGS. 11A-11C are partial bottom views of the battery modules shown in FIGS. 10A and 10B according to various exemplary embodiments.

As shown in FIG. 11A, according to an exemplary embodiment, the thermally conductive plate 43A, B may include four tubes 72A having passages 74A (e.g., as shown in FIG. 10A) or four channels 74B (e.g., as shown in FIG. 10B). According to other exemplary embodiments, the thermally conductive plate 43A, B may include a greater or lesser number of tubes or channels, depending on the desired cooling (or heating) requirements of the application.

According to an exemplary embodiment, the thermal management fluid enters the passages 74A or channels 74B at a first end of the thermally conductive plate 43A, B and exits the passages 74A or channels 74B at a second end of the thermally conductive plate 43A, B opposite the first end of the thermally conductive plate 43A, B. As such, the fluid flows from an inlet or first side of the thermally conductive plate 43A, B to an outlet or second side of the thermally conductive plate 43A, B, with all of the fluid flowing in the same direction (e.g., in a generally parallel fashion).

According to an exemplary embodiment, as shown in FIG. 11A, an inlet manifold 80 may be provided adjacent the inlet side of the passages 74A or channels 74B to supply the fluid from a single source to the multiple passages 74A or channels 74B. Similarly, an outlet manifold 81 may be provided adjacent the exit side of the passages 74A or channels 74B to collect the fluid from the multiple passages 74A or channels 74B.

Figure 11B:
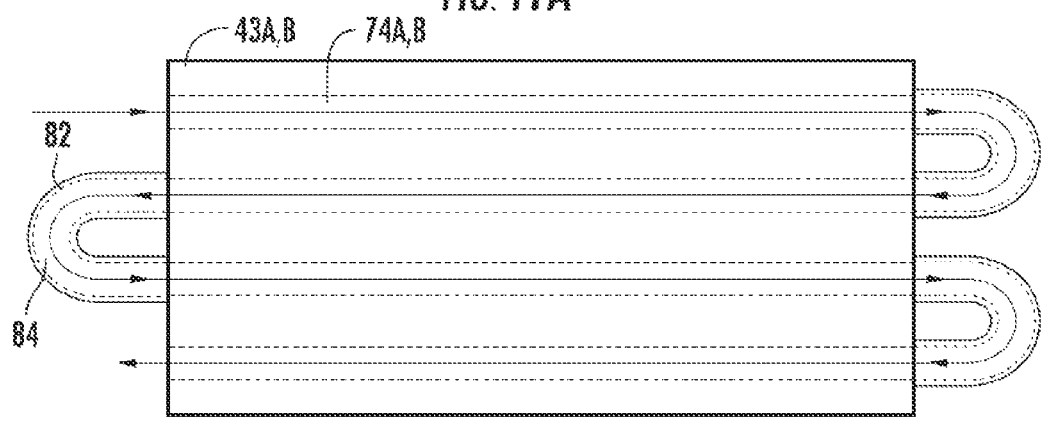

According to another exemplary embodiment, as shown in FIG. 11B, the individual passages 74A or channels 74B may be interconnected to one another by members shown as connection members 82. The connection members 82 have an internal passage 84 that directs fluid from a first passage 74A or channel 74B to a second passage 74A or channel 74B. As such, the fluid flows from an inlet or first side of the thermally conductive plate to a second side of the thermally conductive plate 43A, B, and then is routed back to the first side of the thermally conductive plate 43A, B via the connection member 82. The fluid may cycle from one end of the thermally conductive plate 43A, B to the other end of the thermally conductive plate and continue back and forth in a winding or serpentine manner (e.g., as shown in FIG. 11B) with the inclusion of multiple connection members 82.

Figure 11C:
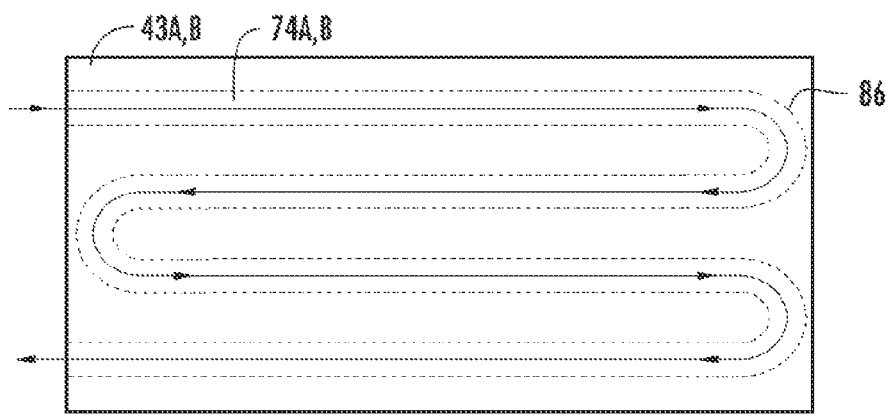

As shown in FIG. 11B, the fluid changes directions (via the connection members 82) at a point outside the thermally conductive plate 43A, B. According to another exemplary embodiment, as shown in FIG. 11C, the fluid changes direction inside the external perimeter of the thermally conductive plate via curved channel 86. As shown in FIG. 11C, the connection members 86 are 180° bends or turn-arounds inside the external perimeter of the thermally conductive plate 43A, B. As shown in FIGS. 11B and 11C, both the inlet and the outlet for the fluid are located on the same end or side of the thermally conductive plate 43A, B. According to another exemplary embodiment, the inlet and outlet may be on different ends or sides of the thermally conductive plate 43A, B.

It should be noted that the manifolds 80, 81 shown in FIG. 11A, connection members 82 shown in FIG. 11B, and connection members 86 shown in FIG. 11C as may be used with both the external tubes 72A having passages 74A or the internal passages 74B.

Figure 10C:
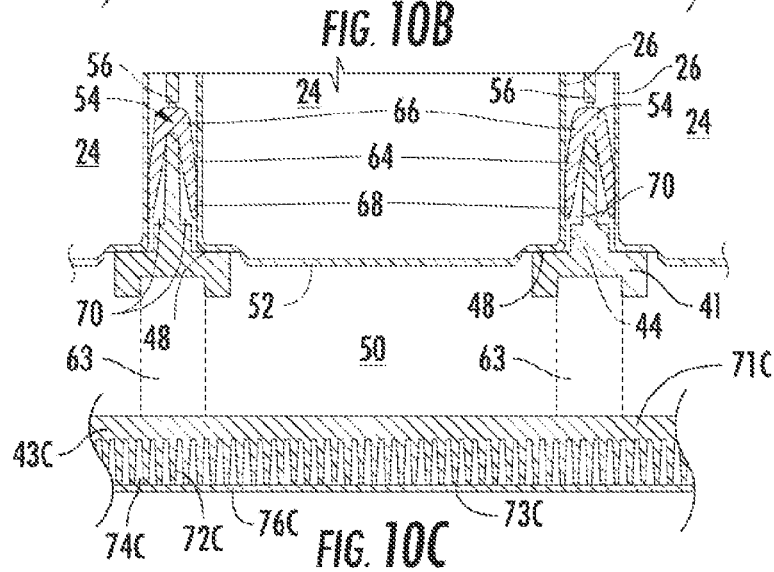

Referring now to FIG. 10C, according to an exemplary embodiment, a thermally conductive plate 43C is shown as a heat sink. The heat sink 43C has an upper portion 71C that forms the bottom surface of the chamber 50. According to one exemplary embodiment, optional posts or supports 63 may conductively couple the upper portion 71C of the heat sink 43C to the upper portion 41 of the tray 42.

According to one exemplary embodiment, the heat sink 43C has projections or fins 72C that extend downward from the upper portion 71C of the heat sink 43C. As shown in FIG. 10C, according to an exemplary embodiment, the fins 72C are tapered (e.g., become smaller) from the upper portion 71C to a tip 73C of the fin 72C. However, according to another exemplary embodiment, the fins 72C may not be tapered or may have another configuration.

According to one exemplary embodiment, as shown in FIG. 10C, the tip 73C of the fins 72C are in contact with the bottom member 76C of the heat sink 43C. According to one exemplary embodiment, the fins 72C are conductively coupled to the bottom member 76C. As shown in FIG. 10C, hollow passages or channels 74C are formed in between adjacent fins 72C. These passages 74C are configured to receive a thermal management fluid therethrough to cool and/or heat the heat sink 43C (and thus the cells 24).

Figure 12:
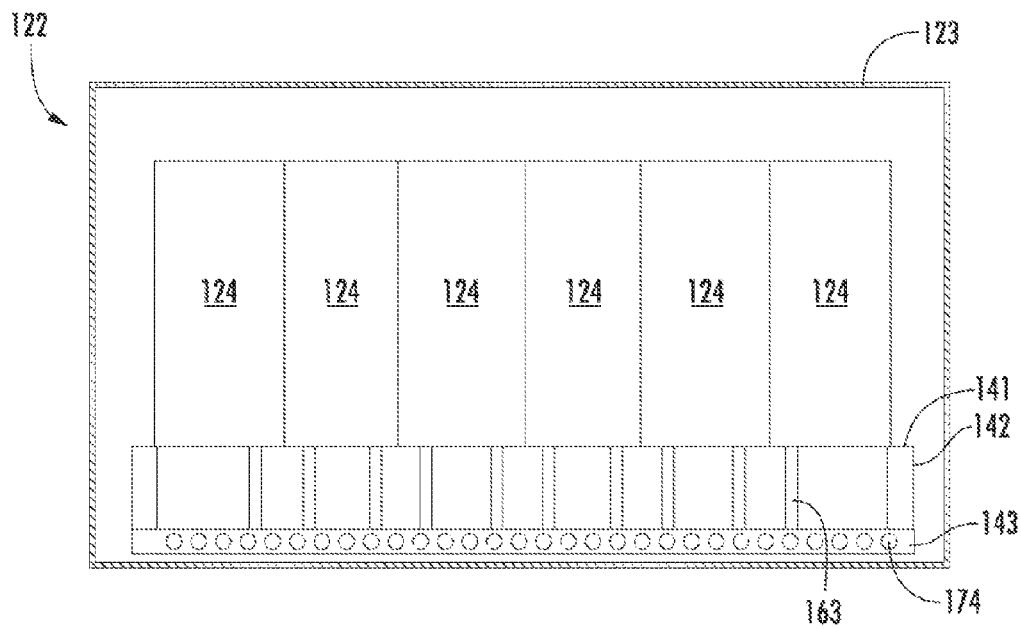
FIG. 12 is a partial cross-sectional view of a battery module according to an exemplary embodiment.

Referring now to FIG. 12, a partial cross-sectional view of a battery module 122 is shown according to an exemplary embodiment. The battery module 122 has a generally horizontal orientation, with a plurality of electrochemical cells 124 arranged side-by-side one another within a housing 123. The cells 124 are provided in a support or tray 142 such that the central longitudinal axes of the cells 124 are in a generally vertical orientation. According to another exemplary embodiment, the battery module 122 may have a generally vertical orientation (e.g., with the battery module 122 rotated either 90 degrees left or right so that the central longitudinal axes of the cells 124 are generally horizontal).

According to an exemplary embodiment, a lower portion (not shown) of the cells 124 are supported by an upper portion 141 of the tray 142 (e.g., by sockets (not shown)). The upper portion 141 of the tray 142 (and or the sockets) is conductively coupled to a bottom portion 143 of the tray 142 by outer sides or edges of the tray 142 and by optional posts or supports 163 to provide a direct thermal conductive connection from the lower portion of the cells to the bottom portion 143 of the tray 142. According to an exemplary embodiment, the bottom portion 143 of the tray 142 is a thermally conductive plate that is configured to aid in cooling (or heating) of the cells 124.

As shown in FIG. 12, the thermally conductive plate 143 includes a plurality of internal passages or channels 174. According to an exemplary embodiment, the channels 174 are similar to the channels 74 shown in FIGS. 10B and 11A-11C. According to an exemplary embodiment, the channels 174 may be connected with manifolds (e.g., such as shown in FIG. 11A), connection members (e.g., such as shown in FIG. 10B), or curved channels (e.g., such as shown in FIG. 11C). According to various exemplary embodiments, the number of channels 174 may vary depending on the desired cooling (or heating) requirements of the application.

According to an exemplary embodiment, the channels 174 are configured to have a liquid coolant (e.g., refrigerant, water, water-glycol mixture, etc.) flow therethrough to cool the cells 124. It should be noted that the thermally conductive plate 143 may also be used for heating the cells 124 of the battery module 122, depending on the specific requirements of the application. It should also be noted that air (or other suitable gas) may be used instead of the liquid coolant. According to another exemplary embodiment, the channels 174 may be replaced with external tubes (e.g., similar to that shown in FIG. 10A) or a heat sink having fins (e.g., similar to that shown in FIG. 10C).

Figure 13:
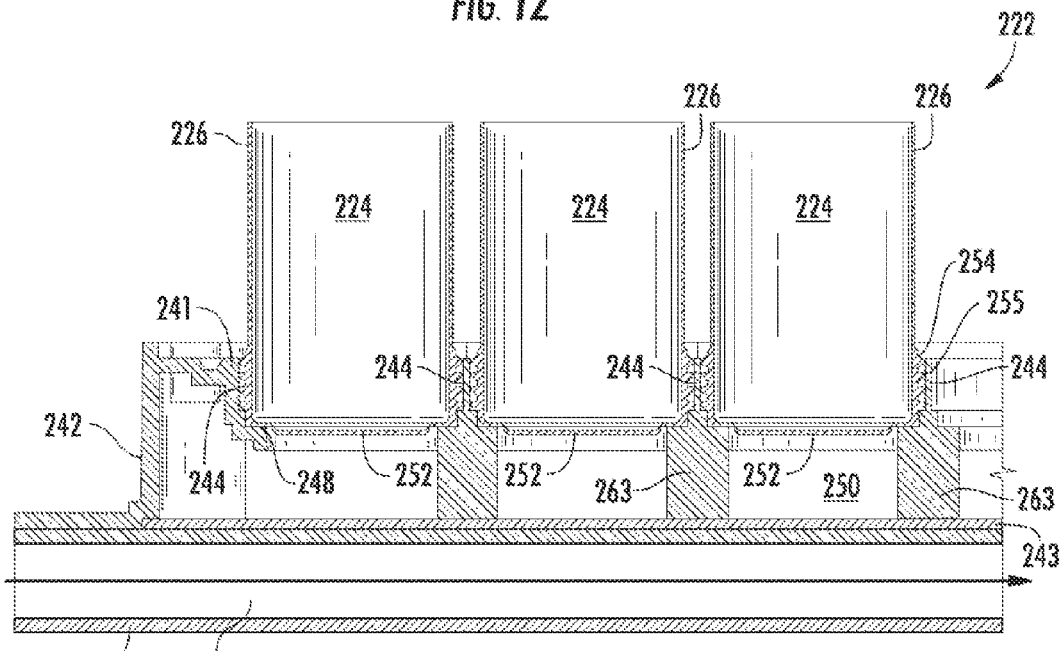
FIG. 13 is a partial cross-sectional view of a battery module according to another exemplary embodiment.

Referring now to FIG. 13, a partial cross-sectional view of a battery module 222 is shown according to another exemplary embodiment. The battery module 222 includes a plurality of electrochemical cells 224 that are provided in a support or tray 242. According to an exemplary embodiment, a lower portion of the cells 224 (e.g., a lower portion of the housings 226 of the cells 224) are supported by an upper portion 241 of the tray 242. For example, as shown in FIG. 13, the lower portions of the cells 224 are received within sockets 244 of the upper portion 241 of the tray 242.

According to an exemplary embodiment, the sockets 244 of the tray 242 substantially surround (e.g., cover, contain, circumscribe, etc.) the lower portion of the cells 224 to conductively cool the cells. By surrounding a lower portion of the cells 224, the internal cell elements (not shown) of the cells 224 are more effectively cooled. According to one exemplary embodiment, the sockets 244 surround about 20 mm (of height) of the lower portion of the cells 224. According to other exemplary embodiments, the sockets surround more or less than 20 mm of the lower portion of the cells 224.

According to one exemplary embodiment, the upper portion 241 of the tray is conductively coupled to a lower or bottom portion 243 of the tray 242 by outer sides of the tray 242 and optional posts or supports 263. According to an exemplary embodiment, the bottom portion 243 of the tray 242 is a thermally conductive plate that is configured to aid in cooling (or heating) of the cells 224. By having the cells 224 in thermal conductive contact with the thermally conductive plate 243 provides for a (direct) conductive path for heat to be drawn out of the cells 224 (for cooling) or for heat to be provided to the cells 224 (for heating). This allows for more efficient and effective cooling and/or heating of the cells 224.

According to an exemplary embodiment, as shown in FIG. 13, the bottom portion 243 is coupled to at least one external tube 272. The at least one external tube 272 includes a hollow passage 274 that is configured to have a liquid coolant (e.g., refrigerant, water, water-glycol mixture, etc.) flow therethrough to cool the cells. According to an exemplary embodiment, the tube 272 may have a cylindrical shape. However, according to other exemplary embodiments, the tube 272 may have other shapes (e.g., prismatic, rectangular, oval, polygonal, etc.)

It should be noted that the thermally conductive plate 243 and/or external tube 272 may also be used for heating the cells 224 of the battery module 222, depending on the specific requirement of the application. It should also be noted that air (or other suitable gas) may be used instead of the liquid coolant. According to another exemplary embodiment, the tubes 272 may be replaced with internal passages or channels (e.g., similar to that shown in FIG. 10B) or a heat sink having fins (e.g., similar to that shown in FIG. 10C).

According to an exemplary embodiment, both the tray 242 and the thermally conductive plate 243 are constructed from a thermally conductive material (e.g., aluminum, aluminum alloy, copper, copper alloy, steel, steel alloy, etc.). Having a thermally conductive tray 242 and thermally conductive plate 243 allows for relatively efficient thermal management (e.g., cooling and/or heating) of the cells 224 within the battery module 222.

According to an exemplary embodiment, when a thermally conductive material is used for the tray 242 and the housings 226 of the cells 224 have a charge (e.g., a positive or negative charge), an electrically insulative member (e.g., such as seal 254 shown in FIG. 13) may be provided between the housing 226 of the cell 224 and the socket 244 and/or step 248 so that the cell 224 and the tray 242 are not in electrical contact with one another. According to the exemplary embodiment shown in FIG. 13, the seals 254 include multiple ridges 255 that aid in sealing any gases vented from the cells 224 via the vents 252 into the common chamber 250.

According to an exemplary embodiment, the electrically insulative member is a good conductor of heat in order to efficiently conduct heat away from the cell 224 (and to the tray and the thermally conductive plate 243). According to an exemplary embodiment, the electrically insulative member is constructed from a silicone or other suitable material (e.g., a poly vinyl chloride (PVC) film). According to an exemplary embodiment, the electrically insulative member has a thickness in the range of approximately 0.05 to 0.25 millimeter. According to another exemplary embodiment, the insulator has a thickness of 0.13 millimeters. However, the thickness of the insulator may be greater or smaller according to other exemplary embodiments.

The tray 242 and/or thermally conductive plate 243 may be formed by a casting process (e.g., a die casting process), a stamping process, or any other suitable process. According to an exemplary embodiment, the tray 242 is constructed from more than one piece (e.g., the upper portion 241 of the tray 42 may be formed as one piece and the bottom half of the tray (i.e., the thermally conductive plate 243) is formed as one piece, with the separate pieces being coupled together to form the tray 242). According to other exemplary embodiments, the tray 242 and thermally conductive plate 243 may be constructed as one single piece (e.g., a single unitary body).

Figure 14A:
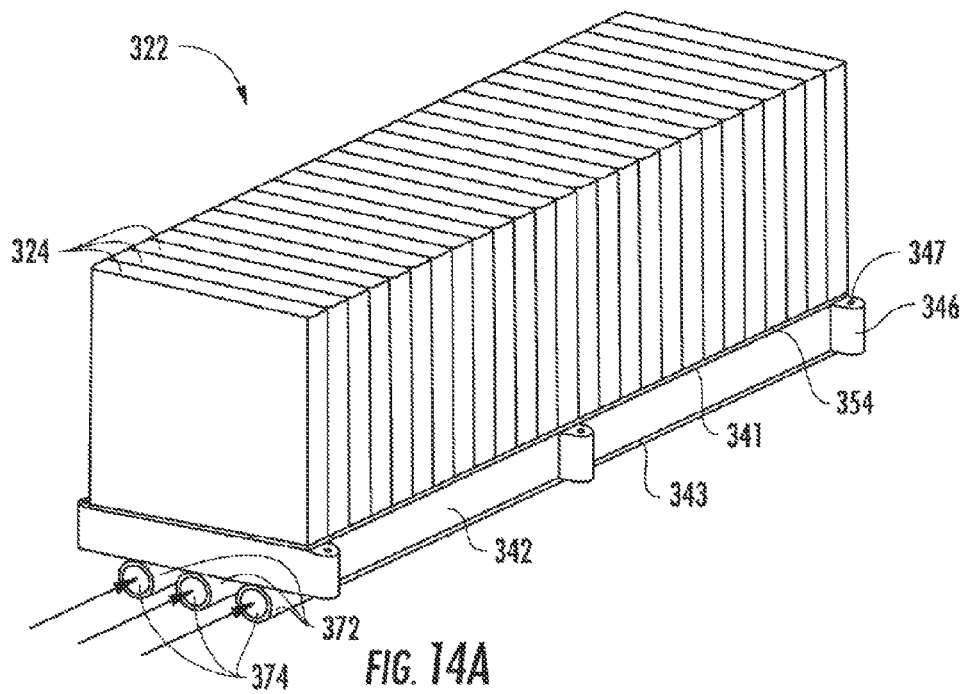

Referring now to FIG. 14A, a battery module 322 is shown according to another exemplary embodiment. The battery module 322 includes a plurality of electrochemical cells 324. As shown in FIG. 14A, the electrochemical cells 324 are prismatic cells that are arranged side-by-side one another. However, according to other exemplary embodiments, the electrochemical cells 324 may have other shapes and/or configurations (e.g., cylindrical, polygonal, oval, etc.).

As shown in FIG. 14A, the electrochemical cells 324 are provided on an upper portion 341 of a structure or tray at 342. According to an exemplary embodiment, an electrically-insulating member shown as a gasket 354 is provided between the electrochemical cells 324 and the tray 342. According to an exemplary embodiment, the gasket 354 comprises an electrically insulating, yet thermally conductive material (e.g., silicone, polyvinyl chloride (PVC), or other suitable material). According to an exemplary embodiment, the gasket 354 has a thickness in the range of approximately 0.05 to 0.25 millimeter. According to another exemplary embodiment, the gasket 354 has a thickness of 0.13 millimeters. However, the thickness of the gasket 354 may be greater or smaller according to other exemplary embodiments.

According to an exemplary embodiment, the tray 342 includes a plurality of projections or bosses 346 that aid in securing the tray within a battery system or vehicle. As shown in FIG. 14A, each of the bosses 346 includes a through hole 347 in which to receive a fastener (not shown).

To aid in cooling or heating the cells 324 of the battery module 322, a plurality of tubes 372 may be provided below and/or coupled to a bottom 343 of the tray 342. As shown in FIG. 14A, each of the tubes 372 includes a hollow passage 374 configured for receiving a thermal management fluid (e.g., gas or liquid) therethrough to cool (or heat) the cells 324.

As shown in FIG. 14A, according to an exemplary embodiment, the flow of the fluid is from a first end of the battery module 322 to a second end of the battery module 322 opposite of the first end of the battery module 322. However, according to another exemplary embodiment, the flow of the fluid may alternate among the individual tubes 372. For example, the flow through a first tube 372 may be from a first end of the battery module 322 to a second end of the battery module while the flow in a second tube 372 is from a second end of the battery module 322 to the first end of the battery module 322. The direction of the flow of the fluid may then alternate among the individual tube 372 back and forth.

According to another exemplary embodiment, the ends of the individual tubes 372 may be connected to one another. For example, the ends of the tubes 372 may be connected by a manifold (e.g., such as manifold 382 shown in FIG. 17A) for generally parallel flow. Alternatively, the ends of the tubes 372 may be connected by a member (e.g., such as connection member 82 shown in FIG. 11B) for winding or serpentine flow through the battery module 322.

According to an exemplary embodiment, the tray 342 and/or tubes 372 may be made of a thermally conductive material (such as, e.g., aluminum (or aluminum alloy), copper (or copper alloy), steel (or steel alloy), or other suitable material). According to an exemplary embodiment, the tubes 372 are welded (e.g., laser welded) to the bottom portion 343 of the tray 342.

Figure 14B:
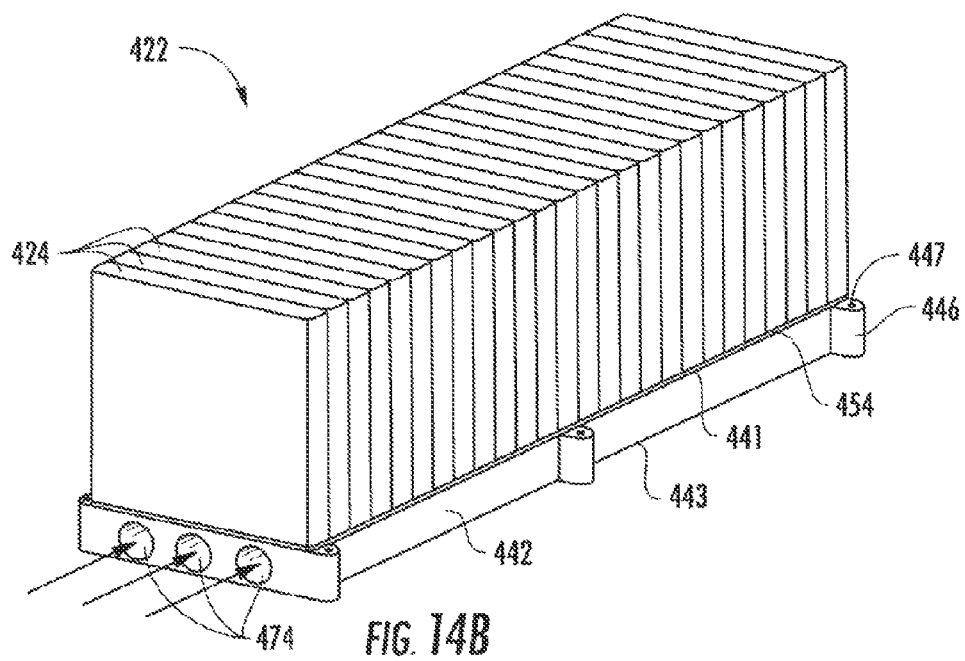

Referring now to FIG. 14B, a battery module 422 is shown according to an exemplary embodiment. According to an exemplary embodiment, the battery module 422 includes features similar to those shown in FIG. 14A (with similar features to those in FIG. 14A labeled with corresponding reference numbers in the 400 series). As shown in FIG. 14B, the tray 442 includes a plurality of internal channels or passages 474. According to an exemplary embodiment, the passages 474 extend from a first end of the battery module 422 to a second end of the battery module 422 and are configured to receive a fluid (e.g., gas or liquid) therethrough to cool (or heat) the cells 424 of the battery module 422. Similar to the flow through the tubes 372 shown in FIG. 14A, the flow through the passages 474 may be in one direction from a first end of the battery module 422 to the second end of the battery module 422 or may flow back and forth in a winding or serpentine fashion.

Referring now to FIG. 14C, a battery module 522 is shown according to an exemplary embodiment. According to an exemplary embodiment, the battery module 522 includes features similar to those shown in FIG. 14A (with similar features to those in FIG. 14A labeled with corresponding reference numbers in the 500 series). As shown in FIG. 14C, the tray 542 includes a heat sink 570. The heat sink 570 includes a plurality of fins 572 extending from an upper portion of the heat sink 570 to a bottom portion 576 of the heat sink 570. As shown in FIG. 14C, the fins 572 are tapered (e.g., become smaller) from the upper portion of the heat sink 570 to the bottom portion 576 of the heat sink 570. However, according to other exemplary embodiment, the fins 572 may not be tapered or may have a different configuration.

According to an exemplary embodiment, a tip 573 of each of the fins 572 is conductively coupled to the bottom portion 576 of the heat sink 570 to form hollow channels or passages 574 in between each of the fins 572 of the heat sink 570. According to an exemplary embodiment, the passages 574 extend from a first end of the battery module 522 to a second end of the battery module 522 and are configured to receive a thermal management fluid (e.g., gas or liquid) therethrough to cool (or heat) the cells 524.

Figure 14E:
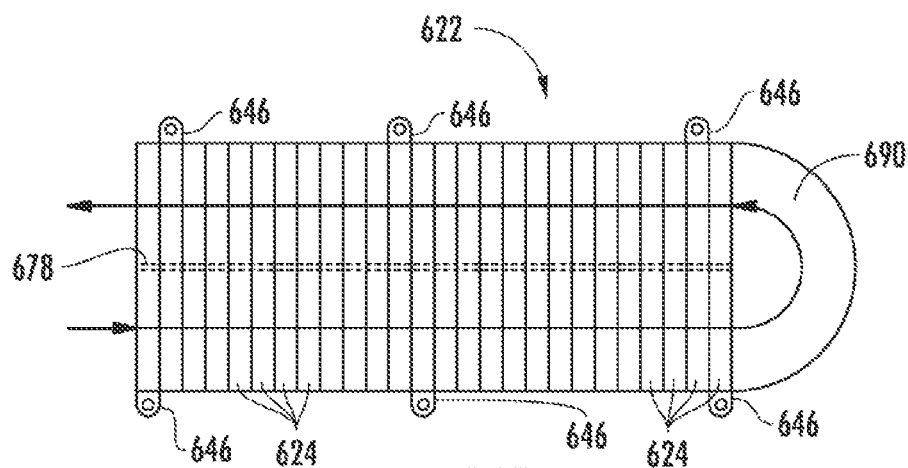
FIG. 14E is a partial top view of the battery module shown in FIG. 14D according to an exemplary embodiment.

Referring now to FIGS. 14D-14E, a battery module 622 is shown according to an exemplary embodiment. According to an exemplary embodiment, the battery module 622 includes features similar to those shown in FIG. 14C (with similar features to those in FIG. 14C labeled with corresponding reference numbers in the 600 series).

As seen best in FIG. 14D, a gasket 654 includes projections 656 that extend over the bosses 646. According to an exemplary embodiment, each projection 656 includes a hole 658 that corresponds with the hole within the boss 646 such that a fastener provided in the boss 646 will also secure the gasket 654 in place.

As seen best in FIG. 14E, the projections 646 on one side of the battery module 622 are provided offset from the projections 646 on the opposite side of the battery module 622. This is to allow multiple battery modules to be placed side-by-side one another when provided in a battery system (e.g., such as battery systems shown in FIGS. 17A through 17D).

According to an exemplary embodiment, the battery module 622 includes a heat sink 670 having a member or structure 678 (e.g., wall, divider, etc.) provided generally in the middle of heat sink 670. The member 678 extends from an upper portion 641 of the tray 642 to a bottom portion 676 of the heat sink 670 to separate the heat sink 670 into a first set of passages 674 and a second set of passages 674. A connection member 690 may be provided at an end of the heat sink 670 to route or direct fluid from the first set of passages 674 of the heat sink 670 to the second set of passages 674 of the heat sink 670 (e.g., as shown in FIG. 14E).

One advantage of having the fluid flow in a first direction through the first set of passages 674 and then in a second direction through the second set of passages 674 is that it allows for more even cooling (or heating) of the cells 624 in the battery module 622. This helps to result in the cells 624 having a longer life and more even operating characteristics (e.g., voltage, current, charge capacity, etc.).

Figure 14F:
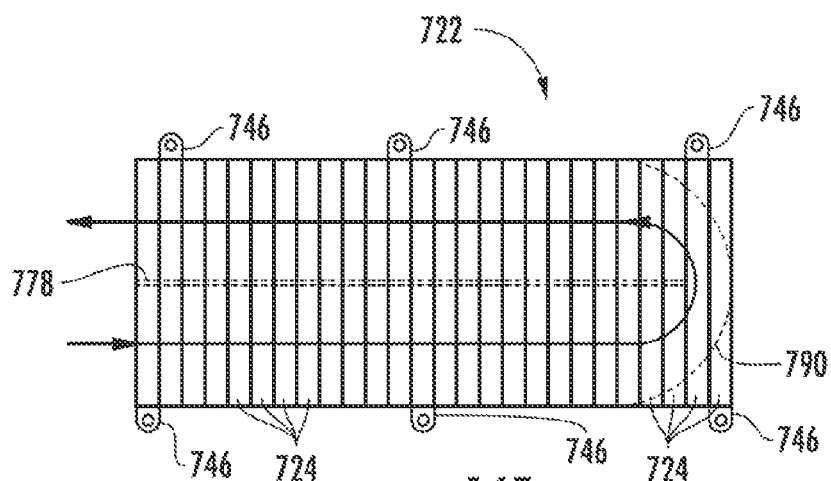
FIG. 14F is a partial top view of a battery module according to another exemplary embodiment.

As shown in FIG. 14E, the member 678 extends from a first end of the battery module 622 to a second end of the battery module 622 under all the plurality of cells 624. According to another exemplary embodiment, as shown in FIG. 14F, a member 778 does not extend under all of the cells 724. For example, the member 778 (and the fins of the heat sink) does not extend underneath the two cells 724 at the far right end of the module 722. It should be noted that the battery module 722 shown in FIG. 14F includes features similar to those shown in FIG. 14E (with similar features to those in FIG. 14E labeled with corresponding reference numbers in the 700 series).

Referring to FIG. 14F, according to an exemplary embodiment, a feature shown as a curved member or wall 790 may be provided within the heat sink or tray of the battery module 722 to aid in directing the flow of the fluid from the first set of passages to the second set of passages. As shown in FIG. 14F, the curved wall 790 is provided under the five rightmost cells 724 of the battery module 722; however, according to other exemplary embodiments, the curved wall 790 may have a different configuration and position.

Figure 15:
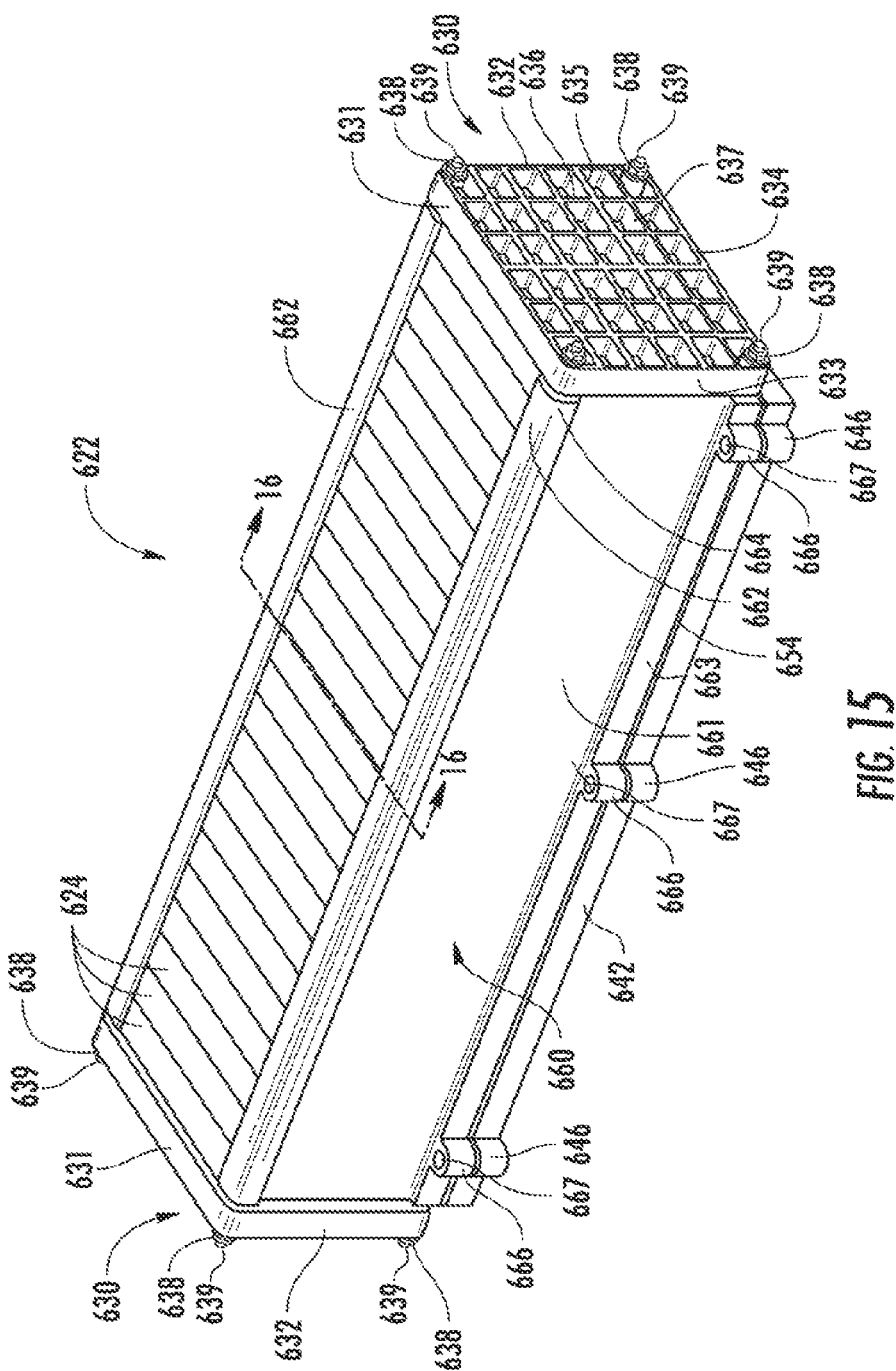
FIG. 15 is a perspective view of the portion of the battery module of FIG. 14D including side panels and end caps according to an exemplary embodiment.
Figure 16:
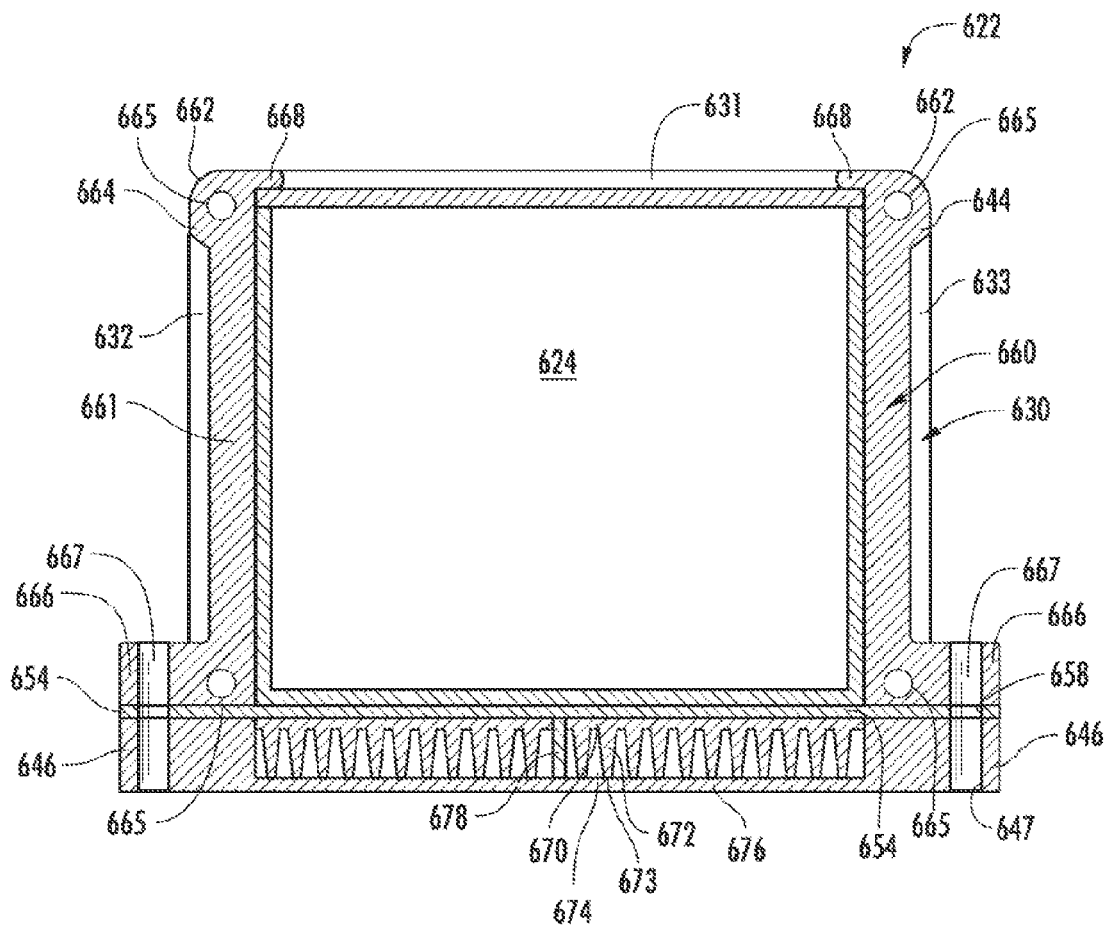
FIG. 16 is a cross-sectional view of the battery module of FIG. 15 taken along line 16-16 of FIG. 15.

Referring now to FIGS. 15-16, the battery module 622 illustrated in FIG. 14D is shown to include side panels 660 and end caps 630 according to an exemplary embodiment. The side panels 660 and end caps 630 are used to position and/or secure the individual cells 624 within the battery module 622. According to an exemplary embodiment, each of the side panels 660 includes a main body 661 having a top portion 662 and bottom portion 663. The top portion 662 includes an enlarged portion 664 substantially surrounding a through hole 665, while the bottom portion 663 includes an enlarged portion substantially surrounding another through hole 665.

According to an exemplary embodiment, the through hole 665 are configured to receive a rod or fastener 639 having threaded ends in order to fasten an end cap 630 on either end of the battery module 622 (e.g., by threading a nut 638 onto each fastener 639). According to another exemplary embodiment, the side panel 660 may include a threaded hole in which to receive a fastener (e.g., such as a bolt or a screw) to secure the end panel 630. According to another exemplary embodiment, the side panel 660 may include a stud extending out from each hole 665 in which to secure the end cap 630.

According to an exemplary embodiment, the top portion 662 includes a ridge or projection 668 that extends out from the top portion 662 in a direction generally perpendicular to the main body 661 of the side panel 660. A bottom portion of the projection 668 is configured to contact a top portion of each of the cells 624 to hold (e.g., clamp, position, retain, etc.) the cells 624 in place. According to an exemplary embodiment, the ridge 668 extends all along the side panel 660 from a first end of the side panel 660 to the second end of the side panel 660. According to one exemplary embodiment, the inside surface of the main body 661 of the side panel 660 contacts a side of each of the cells 624 to hold (e.g., clamp, position, retain, etc.) the cells 624 in place.

According to an exemplary embodiment, the bottom portion 663 of the side panel 660 includes a plurality of projections or bosses 666 having through holes 667. As shown in FIG. 15, the bosses 666 and holes 667 are substantially complimentary to the bosses 646 and holes 647 of the tray 642. A fastener (not shown) can be inserted through each of the holes 667 of the side panel, the holes 658 of the gasket 654, and the holes 647 of the tray 642 to exert a clamping force on the top of the cells 624 via projection 668.

According to an exemplary embodiment, the end cap 630 includes a top frame member 631, a first side member 632, a second side member 633, and a bottom side member 634 that are connected together to form an outer frame. The multiple frame members 631, 632, 633, 634 are interconnected with a plurality of horizontal members 635 and a plurality of vertical members 636. The horizontal members 635 and vertical members 636 interconnect one another to form an opening or hollow 637. The end cap 630 also includes four holes (not shown) generally located adjacent the corners of the outer frame that are configured to receive a fastener (e.g. such as a rod or stud 639 that extends from the side panel 660). A nut 638 is screwed onto the fastener 639 to secure the end cap 630 in place.

According to an exemplary embodiment, the side panel 660 and the end cap 630 are used to effectively and efficiently clamp and/or retain the cells 624 within the battery module 622. The end caps 630 (via the fasteners 639 and nuts 638) restrain the individual cells 624 within the battery module 622 generally in a longitudinal direction of the battery module 622 (e.g., in a horizontal direction). The side panels 660 (via projections 668) restrain the individual cells 624 in a direction generally perpendicular to the longitudinal direction of the battery module 622 (e.g., in a vertical direction). Securing of the cells 624 in a vertical direction so that the bottom of the cells 624 are in contact with the gasket 654 and/or the tray 642 ensures that conductive cooling (or heating) will occur more effectively and efficiently.

According to an exemplary embodiment, the side panel 660 and/or the end cap 630 are constructed of a metallic material (e.g., a metal such as a sheet metal). In this embodiment, an insulating material or member (not shown) may be provided between the cells 624 and the side panels 660 and/or the end caps 630 (e.g., between the cells 624 and the inside surface of the main body 661 of the side panels 660 and the bottom portion of the projection 668 of the side panel 660). According to another exemplary embodiment, the side panels 660 and/or the end caps 630 may be coated with a polymeric material. According to another exemplary embodiment, the side panels 660 and/or the end caps 630 are constructed of a polymeric material (e.g., polyethylene, polypropylene, etc.) or other suitable material).

Referring now to FIGS. 17A-17D, various battery systems are shown according to exemplary embodiments. The battery systems shown in FIGS. 17A-17D include a plurality of the battery modules shown in FIGS. 14A-14D, respectively. Due to the similarity of the battery systems 321, 421, 521, and 621 shown in FIGS. 17A-17D, respectively, only the features of battery system 321 will be described in great detail below. It should be noted that the battery systems 421, 521, and 621 include features similar to those shown in FIG. 17A (with similar features to those in FIG. 17A labeled with corresponding reference numbers in the 400, 500, and 600 series, respectively).

Figure 17A:
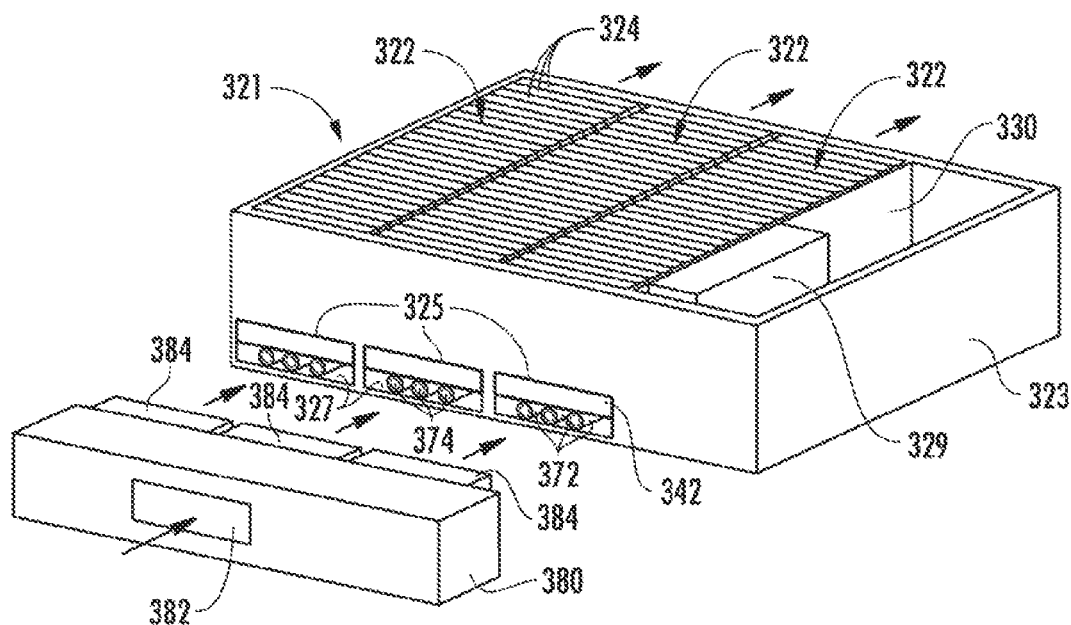
FIG. 17A is a partial perspective view of a battery system including a plurality of battery modules as shown in FIG. 14A according to an exemplary embodiment.

Referring to FIG. 17A, a battery system 321 is shown to include a plurality of battery modules 322 according to an exemplary embodiment. The battery modules 322 are provided side-by-side one another within a housing 323 of the battery system 321. A partition or wall 330 of the housing 323 separates the modules 322 from a control system 329 (e.g., such as a battery management system (BMS)). The battery system 321 may also include a single cover (not shown) to enclose or cover the multiple battery modules 322 and the control system 329 within the housing 323.

As shown in FIG. 17A, the housing 323 of the battery system 321 includes openings 325 through which a thermal management fluid may enter the passages 374 of the tubes 372 of the battery modules 322. According to one exemplary embodiment, the openings 325 are sized to expose the tubes 372 and the tray 342. According to another exemplary embodiment, the openings 325 are sized to expose only the tubes 372.

Figure 17B:
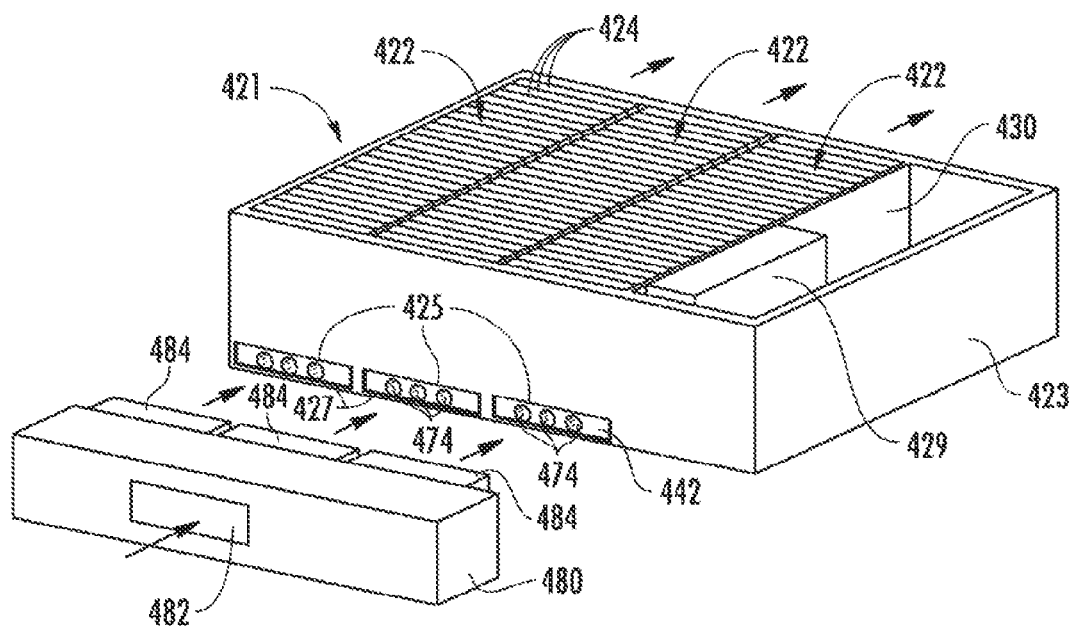
FIG. 17B is a partial perspective view of a battery system including a plurality of battery modules as shown in FIG. 14B according to an exemplary embodiment.
Figure 17C:
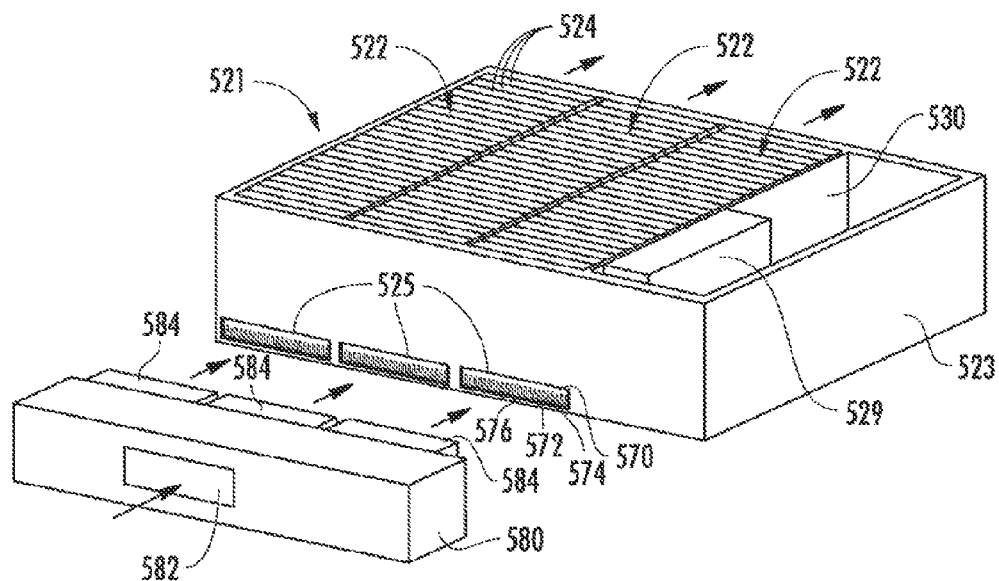
FIG. 17C is a partial perspective view of a battery system including a plurality of battery modules as shown in FIG. 14C according to an exemplary embodiment.

According to an exemplary embodiment, the battery system 321 includes an inlet manifold 380. The manifold 380 includes a single opening 382 configured to receive a single source of thermal management fluid and multiple openings 384 configured to provide the thermal management fluid to the tubes 372 of each of the individual battery modules 322. As shown in FIG. 17B, the inlet manifold 480 provides thermal management fluid to the passages 474 of the individual battery modules 422, while in FIG. 17C, the inlet manifold 580 provides thermal management fluid to the passages 574 of the heat sinks 570 of the individual battery modules 522. According to an exemplary embodiment, the battery system 321 (and battery systems 421 and 521) may also include an outlet manifold (not shown) similar to the inlet manifold 380.

Figure 17D:
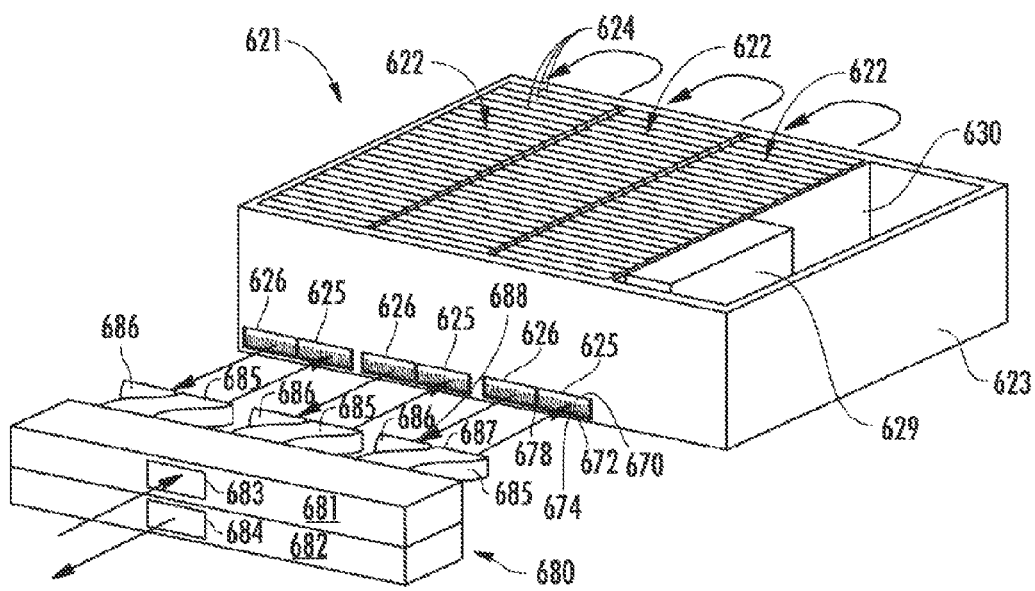
FIG. 17D is a partial perspective view of a battery system including a plurality of battery modules as shown in FIG. 14D according to an exemplary embodiment.

As shown in FIG. 17D, the battery system includes a manifold 680 having an inlet portion 681 and an outlet portion 682. According to an exemplary embodiment, the inlet portion 681 includes an opening 683 configured to receive a single source of thermal management fluid and multiple channels or ducts 685. The ducts 685 have openings 687 that correspond to openings 625 in the wall of the housing 623 to provide the thermal management fluid to the first set of passages 674 of the heat sink 670 of each of the individual battery modules 622. Likewise, the outlet portion 682 includes an opening 684 configured to return the thermal management fluid from multiple channels or ducts 686. The ducts 686 have openings 688 that correspond to openings 626 in the wall of the housing 623 to receive the thermal management fluid from the second set of passages 674 of the heat sink 670 of each of the individual battery modules 622.

According to an exemplary embodiment, the battery systems 321, 421, 521, and 621 may each have a single fan or pump (not shown) to move the fluid through the battery system. For example, a fan or pump may be located in front of the inlet manifold (or inlet portion of the manifold) to push the fluid through the system. According to another exemplary embodiment, the fan may be located behind the outlet manifold (or outlet portion of the manifold) to pull the fluid through the system.

According to another exemplary embodiment, each battery module may have its own fan or pump to push or pull the fluid through the modules. One advantage of this embodiment is that the individual fans or pumps can be sized smaller than the single fan or pump used for the entire system, thus creating less overall noise for the system. According to yet another exemplary embodiment, individual fans or pumps may be provided in or adjacent the connection members 690 of the battery modules 622 so that the fans or pumps are pulling the fluid through the first half of the heat sink 670 and pushing the fluid through the second half of the heat sink 670. In this case, the noise created by the fans or pumps will be even less, as the fans are subjected to even less pressure drop across the battery module. Also, the fans or pumps are located inside the individual battery modules 622 to further quiet any fan or pump noise produced.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seal for battery system vent chamber as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A battery module, comprising:
   a plurality of electrochemical cells, each electrochemical cell comprising a bottom portion having a vent member;
   a structure comprising an upper portion and a lower portion, the upper portion being configured to support the respective bottom portion of each electrochemical cell of the plurality of electrochemical cells and the lower portion having a thermal management feature to provide thermal management to the electrochemical cells, wherein the thermal management feature comprises a passage disposed in the lower portion of the structure, the passage being configured to direct a thermal management fluid therethrough from an inlet at a first end of the lower portion to an outlet at a second end of the lower portion opposite the first end, wherein the passage is configured such that the thermal management fluid does not directly contact the plurality of electrochemical cells; and a heat sink having a plurality of fins extending away from the plurality of electrochemical cells and into the passage, wherein the thermal management fluid is configured to pass between adjacent fins of the plurality of fins;

wherein the structure comprises a chamber formed between the upper portion of the structure and the lower portion of the structure such that the chamber separates the respective bottom portion of each electrochemical cell of the plurality of electrochemical cells from the heat sink; and wherein the upper portion of the structure comprises a plurality of sockets configured to receive the respective bottom portion of each electrochemical cell of the plurality of electrochemical cells to enable the respective vent member disposed on the respective bottom portion of each electrochemical cell of the plurality of electrochemical cells to vent gases into the chamber.

2. The battery module of claim 1, wherein a first direction from the inlet at the first end of the lower portion to the outlet at the second end of the lower portion is substantially perpendicular to a second direction in which the plurality of electrochemical cells extend upward from the upper portion of the structure.

3. The battery module of claim 1, wherein the plurality of fins extend away from the plurality of electrochemical cells in a first direction that is substantially parallel to a second direction in which the plurality of electrochemical cells extend upward from the upper portion of the structure.

4. The battery module of claim 1, wherein the plurality of fins are tapered.

5. The battery module of claim 1, wherein the plurality of fins extend between and are coupled to the upper portion and the lower portion of the structure.

6. The battery module of claim 5, wherein the plurality of fins span the passage to provide a plurality of passages between the fins for directing the thermal management fluid in a direction between the inlet at the first end and the outlet at the second end.

7. The battery module of claim 1, wherein the thermal management feature is configured to receive cooled air through the inlet of the lower portion, direct the cooled air through the passage, and output the cooled air through the outlet of the lower portion.

8. The battery module of claim 1, wherein the plurality of electrochemical cells comprises prismatic electrochemical cells.

9. The battery module of claim 1, wherein the structure comprises at least one post disposed in the chamber and configured to conductively couple the upper portion of the structure to the lower portion of the structure, to the heat sink, or to a combination thereof.

10. The battery module of claim 1, comprising a thermally conductive and electrically insulating material disposed between the plurality of electrochemical cells and the upper portion of the structure.

11. The battery module of claim 1, comprising a first panel extending along a first side of the plurality of electrochemical cells and a second panel extending along a second side of the plurality of electrochemical cells, wherein the first and second panels are configured to retain the plurality of electrochemical cells against the structure.

12. The battery module of claim 11, wherein the first panel and the second panel each comprise a projection with a through hole formed therein, wherein the through hole of each of the first and second panels aligns with a corresponding hole through the structure for securing the first and second panels to the structure.

13. A battery system, comprising:
a housing;
a plurality of battery modules disposed in the housing, each battery module comprising:
a plurality of electrochemical cells, each electrochemical cell comprising a bottom portion having a vent member; and
a structure comprising an upper portion and a lower portion, the upper portion being configured to support the respective bottom portion of each electrochemical cell of the plurality of electrochemical cells and the lower portion having a thermal management feature to provide thermal management to the electrochemical cells, wherein the thermal management feature comprises a passage disposed in the lower portion, the passage being configured to direct a thermal management fluid therethrough from an inlet at a first end of the lower portion to an outlet at a second end of the lower portion opposite the first end, wherein the passage is configured such that the thermal management fluid does not directly contact the plurality of electrochemical cells; and
a heat sink having a plurality of fins extending away from the plurality of electrochemical cells and into the passage, wherein the thermal management fluid is configured to pass between adjacent fins of the plurality of fins;
wherein the structure comprises a chamber formed between the upper portion of the structure and the lower portion of the structure; and
wherein the upper portion of the structure comprises a plurality of sockets configured to receive the respective bottom portion of each electrochemical cell of the plurality of electrochemical cells to enable the respective vent members disposed on the respective bottom portion of each electrochemical cell of the plurality of electrochemical cells to vent gases into the chamber.

14. The battery system of claim 13, comprising an inlet manifold coupled to the housing adjacent the first end of the lower portion of each of the plurality of battery modules, wherein the manifold is configured to distribute the thermal management fluid into the passage of each of the plurality of battery modules.

15. The battery system of claim 14, wherein the housing comprises a plurality of thermal management fluid inlets aligned with the inlet at the first end of each of the plurality of battery modules disposed in the housing, and wherein the inlet manifold is in fluid communication with each of the plurality of thermal management fluid inlets.

16. A battery module, comprising:
a tray comprising an upper portion configured to support bottom ends of a plurality of electrochemical cells; a lower portion of the tray, wherein the lower portion comprises a thermal management feature configured to provide thermal management to the plurality of electrochemical cells, wherein the thermal management feature comprises a passage disposed in the lower portion of the tray, the passage being configured to direct a thermal management fluid therethrough from an inlet at a first end of the lower portion to an outlet at a second end of the lower portion opposite the first end, and wherein the passage is configured such that the thermal management fluid does not directly contact the plurality of electrochemical cells;

a plurality of sockets disposed in the upper portion of the tray and configured to enable the plurality of electrochemical cells to extend therethrough;

a plurality of vent members disposed in the bottom ends of the plurality of electrochemical cells;

a chamber formed between the upper portion of the tray and the lower portion of the tray and configured to receive the bottom ends of the plurality of electrochemical cells to facilitate venting of the plurality of electrochemical cells through the plurality of vent members into the chamber; and a heat sink disposed in the tray and having a plurality of fins extending away from the plurality of electrochemical cells and into the passage, wherein the thermal management fluid is configured to pass between adjacent fins of the plurality of fins.

17. The battery module of claim 16, wherein a first direction from the inlet at the first end of the lower portion to the outlet at the second end of the lower portion is substantially perpendicular to a second direction in which the plurality of electrochemical cells extend upward from the tray.

18. The battery module of claim 16, wherein the plurality of fins extend away from the plurality of electrochemical cells in a direction that is substantially parallel to a direction in which the plurality of electrochemical cells extend upward from the tray.

19. The battery module of claim 16, comprising a plurality of projections extending outward from the upper portion of the tray, wherein the projections each comprise a hole formed therethrough for fastening panels disposed on opposite sides of the plurality of electrochemical cells against the tray.

20. The battery module of claim 1, wherein a top surface of the heat sink forms a bottom surface of the chamber.

21. The battery module of claim 13, wherein a top surface of the heat sink forms a bottom surface of the chamber.

22. The battery module of claim 16, wherein a top surface of the heat sink forms a bottom surface of the chamber.

\* \* \* \* \*